US006830707B2

(12) United States Patent
Tamura et al.

(10) Patent No.: US 6,830,707 B2
(45) Date of Patent: Dec. 14, 2004

(54) TEMPERATURE INDICATING MATERIAL

(75) Inventors: Toshiyuki Tamura, Mishima (JP); Takayuki Hiyoshi, Suntoh-gun (JP); Yuichiro Hatanaka, Tagata-gun (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 542 days.

(21) Appl. No.: 09/874,058

(22) Filed: Jun. 6, 2001

(65) Prior Publication Data

US 2002/0026002 A1 Feb. 28, 2002

(30) Foreign Application Priority Data

Jun. 6, 2000 (JP) ........................................ 200-168374

(51) Int. Cl.$^7$ ......................... G01N 31/22; C09D 11/02
(52) U.S. Cl. ................................. 252/408.1; 106/31.16
(58) Field of Search .................... 252/408.1; 106/31.17, 106/31.19, 31.2, 31.21, 31.22, 31.16

(56) References Cited

U.S. PATENT DOCUMENTS

| | | | |
|---|---|---|---|
| 5,663,115 | A | 9/1997 | Naito et al. |
| 5,849,651 | A | 12/1998 | Takayama et al. |

FOREIGN PATENT DOCUMENTS

| | | | |
|---|---|---|---|
| JP | 56166093 A | * 12/1981 | |
| JP | 8-197853 | 8/1996 | |

OTHER PUBLICATIONS

U.S. Appl. No. 10/457,373, Tamura et al., filed Jun. 10, 2003.
U.S. Appl. No. 09/987,278, filed Nov. 14, 2001, pending.
U.S. Appl. No. 09/987,263, filed Nov. 14, 2001, pending.

* cited by examiner

*Primary Examiner*—Elizabeth McKane
(74) *Attorney, Agent, or Firm*—Oblon, Spivak, McClelland, Maier & Neustadt, P.C.

(57) ABSTRACT

A temperature indicating material of the present invention includes at least an electron donating compound, an electron accepting compound, a reversible material causing reversible transformation between crystal and amorphous states, or reversible transformation between phase separation and non-phase-separation, with respect to a part or all of the composition system; and a temperature characteristic controller having a solid-state in room temperature and at least a part of the temperature characteristic controller dissolves in the electron accepting compound, the reversible material, or the electron accepting compound and the reversible material so as to change the speed of the reversible transformation between crystal and amorphous, or speed of the reversible transformation between phase separation and non-phase-separation, with respect to the composition system, by its reversible transformation between crystal and amorphous states, or the speed of the reversible transformation between phase separation and non-phase separation.

14 Claims, 14 Drawing Sheets

TEMPERATURE INDICATING MATERIAL

CROSS REFERENCE TO RELATED APPLICATION

The present application is based on Japanese Priority Document 2000-168374 filed on Jun. 6, 2000, the content of which is incorporated herein by reference.

BACK GROUND OF THE INVENTION

1. Field of the Invention

The present invention relates to a temperature indicating material, for used as a temperature indicator which is used for the temperature monitoring of vegetables and fruits, perishable foods and the like, and which undergoes color changes with temperature.

2. Discussion of the Background

As a temperature indicating material which undergoes color changes with temperature, thermochromic organic dye, for example, ethylene derivatives substituted with a fused aromatic ring such as spiropyrans bianthrone or dixanthylene, crystals of a metal complex salt composed of $CoCl_2 \cdot 2(CH_2)_6N_4 \cdot 10H_2O$, combinations of an electron donating compound, an electron accepting compound and a polar organic compound and the like have conventionally been put on the market. Upon use of a temperature indicating label prepared from such a temperature indicating material, color changes with temperature are judged visually.

Roughly speaking, there are two types of temperature indicating materials, that is, a reversible type and irreversible type. In the former one, the color changes unlimitedly in response to a temperature increase or decrease, while in the latter one, the color which has once changed at a certain temperature does not show any further change.

The reversible type material is used for indicating a cooling level for drinking of beer or the like, or for visually attracting attentions to a temperature change.

The irreversible type material is used for the temperature monitoring of fruits and vegetables, or perishable foods, for example. The temperature indicating material which has stored its thermal history is disclosed in Japanese Patent Publication No. SHO 58-10709, wherein an ink having a changeable viscosity with temperature (for example, an ink which has a dye dissolved in oleyl alcohol) penetrates in a penetration material and the length of the ink penetrated in the material indicates how long it was exposed to a temperature not lower than a predetermined temperature. In addition, as another form, there is a temperature indicating material which has a plurality of layers formed on a label. These pluralities of layers are an ink layer, a separate layer, a porous layer and an indicator layer and they are stacked one after another. The separate layer is removed when the temperature monitoring is started, while the porous layer controls the penetration time of the ink from the ink layer until it reaches the indicating layer. For such a temperature indicator member, in case of a predetermined temperature lower than a room temperature, a storing device prior to the starting of temperature monitoring is important, it needs to form the separator or the like, so that it is expensive and in addition, has such a complex structure that a desired printing pattern cannot be adopted. Moreover, this indicator needs a cumbersome operation such as removal of the separator or the like when it starts on the temperature monitoring.

As an improved process, a process using a rewritable material is disclosed in Japanese Patent Application Laid-Open No. 197853/1996, wherein the glass transition temperature of the material is used as a predetermined temperature and temperature monitoring is effected by making use of the fact that a drastic change in the diffusion rate of molecules occurs at a temperature exceeding the glass transition temperature. The above method uses a temperature indicating material including an electron donating compound, an electron accepting compound, a reversible material causing reversible transformation between crystal and amorphous, or reversible transformation between phase separation and non-phase-separation, and a phase separation controller which changes phase separation speed between the electron donating compound or the electron accepting compound and the reversible material. The method defines the glass transition temperature of the composition system lower than room temperature so as to record the history of raising temperature as color change by crystallization of composition system. The method also introduces decolorize for initialized using a thermal head for heating and quenching the temperature indicating material. The heating and quenching mean instantaneous heat application by the thermal head. Thereafter the temperature indicating material shows temperature change in its environment using change color by temperature rising.

However, the rewritable material, as introduced in Japanese Patent Application Laid-Open No. 197853/1996, cannot be decolorized completely and the colorize progresses in low temperature. Thus, the temperature indicating material disclosed in Japanese Patent Application Laid-Open No. 197853/1996 has drawback that large difference been color densities cannot he obtain in response to temperature change.

The phase separation controller disclosed in Japanese Patent Application Laid-Open No. 197853/1996 improves colorize speed around melting point or higher than melting point. Thus, the phase separation controller cannot change setting temperature of the electron donating compound, the electron accepting compound and the reversible material in condition of under room temperature. That is, the melting point of the phase separation controller is set under room temperature, in condition that the setting temperature is lower than room temperature, since colorize speed should be promoted around setting temperature. Thus, the glass transition point becomes too low, so that storage stability cannot be kept sufficiently. Accordingly, the phase separation controller disclosed in Japanese Patent Application Laid-Open No. 197853/1996 is not proper for the temperature indicating material to be used in condition lower than room temperature.

Further, the material having melting point lower than room temperature is not proper for dispersion in a binder resin or the like, since the material is liquid or half solid (border state between liquid and solid). Such material can be dispersed in the binder resin when the system including the electron donating compound, the electron accepting compound and the reversible material and the phase separation controller is formed as micro-capsule, but cost for such system will be increased.

Alicyclic alcohol not having long normal chain like cyclododecanol as disclosed in Japanese Patent Application Laid-Open No. 197853/1996 is generally not proper for use in the phase separating controller. Alicyclic alcohol improves decolorize characteristic when the alicyclic alcohol is used as a temperature characteristic controller. The thermochromisnm controller including alicyclic alcohol can be delaying colorize at low temperature and promoting colorize at high temperature, so that the thermochromisnm controller operates sensitively to temperature. However, mutual action between the temperature characteristic controller including alicyclic alcohol and the electron accepting compound (developer) is large, and alycyclic alcohol prevents the mutual action between the electron donating compound (electron donor organic substances) and the electron accepting compound (developer), so that the colorize density will be poor as compared with case without the temperature characteristic controller.

SUMMARY OF THE INVENTION

Accordingly, an object of the present invention is to provide a temperature indicating material to be capable of executing temperature monitoring operation in the environment under room temperature without various drawbacks.

The object of the present invention is achieved by the novel temperature indicating material of the present invention.

According to the novel temperature indicating material of the present invention, it includes an electron donating compound; an electron accepting compound; a reversible material causing reversible transformation between crystal and amorphous, or reversible transformation between phase separation and non-phase-separation, with respect to a part or all of the composition system; and a temperature characteristic controller. The temperature characteristic controller is solid-state in room temperature. At least a part of the temperature characteristic controller dissolves in the electron accepting compound, the reversible material, or the electron accepting compound and the reversible material so as to change speed of the reversible transformation between crystal and amorphous, or speed of the reversible transformation between phase separation and non-phase-separation, with respect to the position system, by its reversible transformation between crystal and amorphous, or speed of the reversible transformation between phase separations and non-phase separation. The ratio between one mutual action and another mutual action, one mutual action is the mutual action between the electron donating compound and the electron accepting compound after phase separation with respect to the composition system in accordance with change of temperature and time after initialized by heating and quenching, another mutual action is the mutual action between the electron donating compound and the electron accepting compound before initialized, is same or more to the same kind of ratio with respect to the temperature indicating material not including the temperature characteristic controller.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
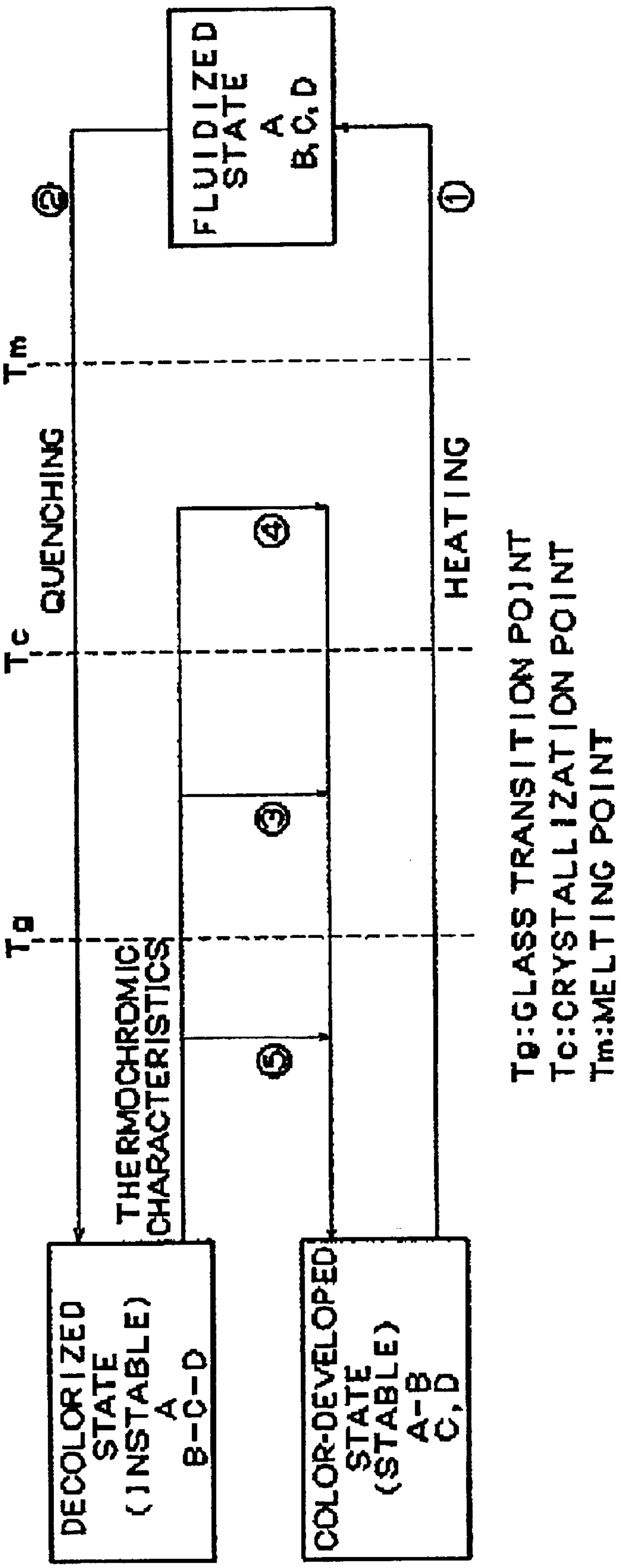
FIG. 1 is a is an explanatory view illustrating the status change of the temperature indicating material based on the thermal conditions of the temperature indicating material according to the present invention.

An embodiment of the present invention is now explained with reference to FIG. 1.

A temperature indicating material of the present invention including an electron donating compound A, an electron accepting compound B, a reversible material C causing reversible transformation between crystal and amorphous states, or reversible transformation between phase separation and non-phase-separation, with respect to a part or all of the composition system, and a temperature characteristic controller D. The temperature characteristic controller D is solid-state in room temperature. At least a part of the temperature characteristic controller D dissolves in the electron accepting compound B, the reversible material C, or the electron accepting compound B and the reversible material C so as to change speed of the reversible transformation between crystal and amorphous, or speed of the reversible transformation between phase separation and non-phase-separation, with respect to the composition system, by its reversible transformation between crystal and amorphous, or speed of the reversible transformation between phase separation and non-phase separation. The ratio between one mutual action and another mutual action, one mutual action is the mutual action between the electron donating compound A and the electron accepting compound B after phase separation with respect to the composition system in accordance with change of temperature and time after initialized by heating and quenching, another mutual action is the mutual action between the electron donating compound A and the electron accepting compound B before initialized, is same or more to the same kind of ratio with respect to the temperature indicating material not including the temperature characteristic controller D.

Operation of the temperature indicating material of this embodiment is summarized as follows. The temperature indicating material of this embodiment is the material adding the temperature characteristic controller D and a binder resin into the basis rewritable system comprising the electron donating compound A (it is called leuco dye hereinafter), the electron accepting compound B (it is called developer hereinafter), and the reversible material C.

A description will next be made of the thermodynamic reversibility of this system with reference to FIG. 1. Under the color developed condition, the developer B and leuco A have strong mutual action, while the reversible material C and the temperature characteristic controller D exists independently in the crystal form. Heating of this temperature indicating material to the melting point Tm or higher (shown by ①) fluidizes the material, which lowers the mutual action between the developer B and the leuco dye A while heightens the mutual action of the temperature characteristic controller D with the developer B and the reversible material C which have been molten by heating, resulting in decolorization. By quenching (as shown by ②) thereafter, the temperature indicating material solidifies in the amorphous state while being strong mutual action between the reversible material C, the developer B and the temperature characteristic controller D and the decolorized state is maintained.

Since the mutual action between the developer B, the reversible material C and the temperature characteristic controller D is strong in the above system, decolorize is completely executed as compared with the system free of the temperature characteristic controller D. Thus colorize (as shown by ⑤) promotes so slowly at temperature range lower than glass transition temperature after heating and quenching. When exposed to high temperatures, the temperature characteristic controller D crystallizes relatively promptly (as shown by ③, ④), losing mutual action with the reversible material C and developer B (it is called phase separation), since the temperature characteristic controller D has phase separation temperature, a crystallizing point and melting point lower than those of the reversible material C. Progression of colorize speed becomes hither when the temperature characteristic controller D crystallizes, since the developer B can be separated easily from the reversible material C.

In this manner, the temperature characteristic controller D is sensitive to temperature, more specifically, retards the progress of color development at low temperatures, but accelerates the progress of color development at high temperatures. The temperature characteristic controller D can preset a responsible temperature in no relation to the melting point of the temperature characteristic controller D at temperature range around room temperature, since the temperature characteristic controller D controls changing speed between crystal and amorphous, or between phase separation and non-phase-separation with respect to the composition system. Further, since the temperature characteristic controller D is solid state at room temperature, the temperature indicating material including the temperature characteristic controller D can be used to the temperature indicator with low cost using around room temperature without special technology.

A temperature indicator makes use of the color development mechanism of the temperature indicating material as follows; thermal energy is applied to the temperature indicating material, which is under a color developing condition by beating Titans such as thermal head to a temperature not lower than the melting point of the temperature indicating material; the electron donating compound (leuco dye A) and electron accepting compound (developer B) are solidified by quenching while being separated from each other; the material is initialized to be a transparent condition; and the color development degree of the initialized part changes, depending on the reaction amount of the electron donating compound (leuco dye A) with the election accepting compound (developer B) which varies with temperature and time.

More details are described below.

The electron donor color developing compound A allows using Crystal Violet lactone, Malachite Green lactone, Crystal Violet carbinol, Malachite Green carbinol, N-(2,3-dichlorodiphenyl)leuco auramine, N-benzoylauramine, Rhodamine B lactam, N-acetylauramine, N-phenylauramie, 2-(phenyl imino ethan dilidene)-3,3-dimethylindoline, N-3,3-trimethyl indolinobenzospiropyran, 8'-methoxy-N-3,3-trimethyl indolinobenzospiropyran, 3-diethylamino-6-methyl-7-chlorofluoran, 3-diethyl amino-7-methoxyfluoran, 3-diethyl amino-6-benzyloxyfluoran, 1,2-benzo-6-diethylaminofluoran, 3,6-di-p-toluidino-4,5-dimethylfluoran-phenylhydrazide-γ-lactam, 3-amino-5-methylfluoran, for example. They may be used alone or in admixture.

The developer B which acts as an electron accepting compound in the present embodiments allows using oxides of a phenol, a metal salt of a phenol, a metal salt of carboxylic acid, sulfonic acid, a sulfonate, phosphoric acid, a metal salt of phosphoric, acid, an acid phosphate ester, a metal salt of an acid phosphate ester, a phosphite or a metal salt of phosphorous acid, for example. They may be used alone or in a admixture.

Reversible material C may be steroid-based compound. For example, cholesterol, stigmastylol, pregnenolone, methylandrostenediol, estradiol Benzoate, epiandrostene, stanolone, β-sitosterol, pregnenolone acetate, or β-cholesterol can be used. They may be used alone or in admixture.

The temperature indicating material of this embodiment is made by mixing the temperature characteristic controller D with the electron donating compound (leuco dye A), the electron accepting compound (developer B) and the reversible material C. The temperature characteristic controller D dissolves in at least one or more of the developer B, the leuco dye A, or the reversible material C, then, promotes decolorize smoothly. Such temperature characteristic controller D allows using aromatic alcohol compound including at least one phenol hydroxide group, aromatic alcohol, compound having at least one benzoyl, group, aromatic ether compound having structure (2)

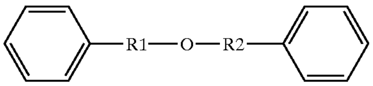

R1 and R2 are not added, or methylene group or (3)

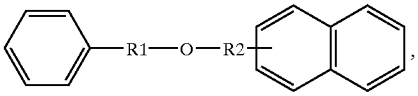

R1 and R2 are not added, or methylene group or sensitizer used as the thermosensible paper. More specifically inventors of the preset invention find that the aromatic alcohol compound including at least one phenol hydroxide group is effective to use p-hydroxy phenethyl alcohol, 2-hydroxy benzyl alcohol, or vanilly alcohol, for example, the aromatic alcohol is piperonyl alcohol, benzoin, benzhydrol, triphenylmethanol, methyl benziylate, or benzyl DL-mandelate, for example, the compound having at least one benzoyl is effective to use benzyl group, benzoin isopropyl ether, benzyl phenyl ketone, or 2-benzoyl methylbenzoate, for example, the aromatic ethyl compound having structure (2)

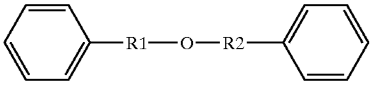

R1 and R2 are not added, or methylene group or (3)

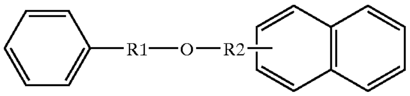

R1 and R2 are not added, or methylene group is effective to use benzyl 2-naphthyl ether, or 1-benzloxy-2-methyl-4-(1-propenyl) benzene, for example, the sensitizer is effective to use 4-benzyl biphenyl, (m-terphenyl), or 4-benzoinbiphenyl.

The temperature indicating material can be used to the temperature indicator as a micro-capsule form, dispersion into a binder resin, or the like.

The binder resin may be used as the binder resin include polyethylenes, chlorinated polyethylenes, ethylene copolymers such as ethylene-vinyl acetate copolymer and ethylene-acrylic acid-maleic anhydride copolymer, Polybutadienes such as Polyesters, polyethylene terephthalate, polybutylene terephthalate and polyethylene naphthalate, polypropylenes, polyisobutylenes, polyvinyl chlorides, polyvinylidene chlorides, polyvinyl acetates, polyvinyl alcohols, polyvinyl acetals, polyvinyl butyrals, fluorocarbon resins, acrylic resins, methacrylic resins, acrylonitrile copolymers, polystyrene, stylene copolymer such as halogenated polystyrene, styrene-methacryate copolymer, acetal resins, polyamides such as nylon 66, polycarbonates, cellulose-based resins, phenolic resins, urea resins, epoxy resins, polyurethane resins, diaryl phthalate resins, silicone resins, polyimide amides, polyether sulfones, polymethyl pentenes, polyether imides, polyvinyl carbazoles, amorphous polyolefins and the like. They may be used alone or in admixture.

When the temperature indicator is made by dispersing the temperature indicating material of this embodiment into the binder resin, thermal energy is applied to the temperature indicator at temperature not lower than melting point of the temperature indicating material by heating means like thermal head, thereafter quench the temperature indicator. The electron donating compound (leuco dye A) and the electron accepting compound (developer B) are solidified by quenching while being separated from each other, so that the temperature indicating material is initialized to be a transparent condition. The initialized parts of the temperature indicating material changes its color development degree depending on the reaction amount of the electron donating compound (leuco dye A) with the electron accepting compound (developer B) according to exposing temperature and time. Such phenomenon can be utilized for temperature monitoring.

As described above, according to the present invention, the temperature indicating material includes the temperature characteristic controller having solid-state in room temperature, at least a part of dissolving in the electron donating compound, the reversible material, or the electron donating compound and the reversible material so as to change speed of the reversible transformation, between crystal and amorphous, or speed of the reversible transformation between phase separation and non-phase-separation, with respect to the composition system, by its reversible transformation between crystal and amorphous, or speed of the reversible transformation between phase separation and non-phase separation, and not preventing the mutual action between the electron donating compound and an electron accepting compound after phase separation thereof. Thus, the temperature indicating material of the present invention is capable of executing temperature monitoring operation in the environment lower than room temperature without various drawbacks. That is, the temperature indicating material can be dispersed into the binder resin easily without special technology like micro-capsule or the like, so that the temperature indicator having above characteristic can be presented with low cost.

Also the colorizing density can be made equal condition or more to the system free to the temperature characteristic controller, decolorized characteristic can be also improved.

Reaction temperature can be shifted to lower temperature as compared with the system free to the temperature characteristic controller. Temperature sensitivity is also improved as compared with the system free to the temperature characteristic controller. Thus, the temperature indicating material of the present invention can identity its storage temperature correctly.

In addition, a reflectance upon decolorization is improved, which improves an S/N ratio when the condition upon color development is read mechanically. Even when the condition must be confirmed visually, the color development by exposure to high temperatures can be detected easily.

Experiment result

Figure 2:
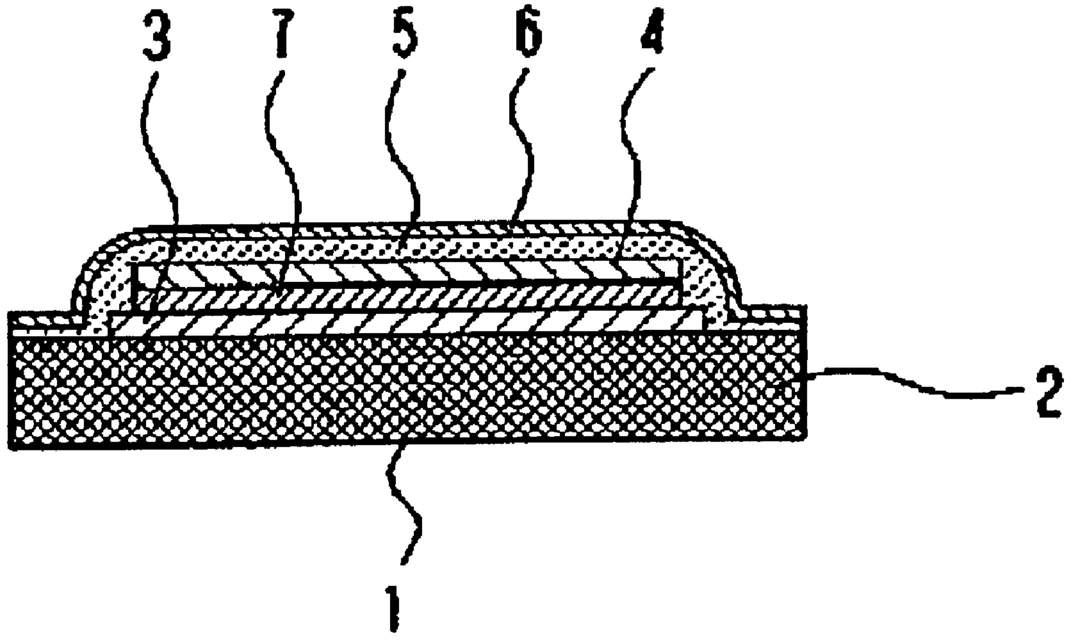
FIG. 2 is a cross-sectional view illustrating a temperature indicator, which has been prepared using the temperature indicating material of the present invention.

The inventors of the present invention make a temperature indicating material like showing in FIG. 2 by dispersing the above mentioned temperature indicating material into the binder resin: styrene methacryate copolymer: methacrylic acid 10% (5 parts by weight), and experiment as mentioned following.

The temperature indicating material is prepared as follows: first, a coating solution is prepared by completely dissolving a binder resin of a 4:1 mixed solvent of toluene and cyclohexanone, adding the leuco dye A, the developer B, the reversible material C, and the temperature characteristic controller D to the resulting resin solution, charging glass beads of about diameter 3 mm to the resulting mixture to a height of the liquid surface, and stirring the mixture for about 1 hours in a paint shaker. The coating solution thus obtained is applied to PET 7 of 38 μm thick by a bar coater, followed by distillation of the solvent, whereby the temperature indicating material 4 of 70 μm thick is prepared. The temperature indicator 1 was prepared by successively adhering to a white PET base 2, a thermal diffusion preventive layer 3 and temperature indicating material 4. PEN (polyethylene naphthalate) 5 added with a sticking preventive layer 6 was laminated as a protecting layer against the discoloration by a thermal head.

Hereinafter, several examples of the temperature indicator 1 and some comparative examples to the examples are described. The same or similar matters as those in the above are not again explained hereinafter. However, method for producing the temperature indicator 1 is described in case that method is different to the above.

The thermal head of Kyocera Co., Ltd. (resistance value of thermal resistance elements: 1.1 kΩ, dots density: 200 dpi) is used to erase the density of the temperature indicating material 4 included in the temperature indicator 1 with an application voltage of 18 V and a pulse widths of 3.5 m sec. Following examples and comparative examples of the experiment and its evaluations are based on the same condition. In the experiment, initialized parts of the temperature indicating material 4, which is left in the environment of 10° C., 20° C., and 30° C. is determined using spectral densitometer (X-Rite 938: product of X-Rite co.).

<Example 1>

| | |
|---|---|
| Leuco Dye A: "GN-2" (trade name; product of-Yamamoto Chemicals, Inc.) | 1 part by weight |
| Developer B: Propyl gallate | 1 part by weight |
| Reversible material C: Pregnenolone | 10 parts by weight |
| Temperature characteristic controller D: p-hydroxy phenethyl alcohol | 1 part by weight |

The inventors of the present invention make a temperature indicator 1 like showing in FIG. 2 by dispersing the above mentioned temperature indicating material into the binder resin; styrene methacryate copolymer: methacrylic acid 10% (5 parts by weight).

Figure 3:
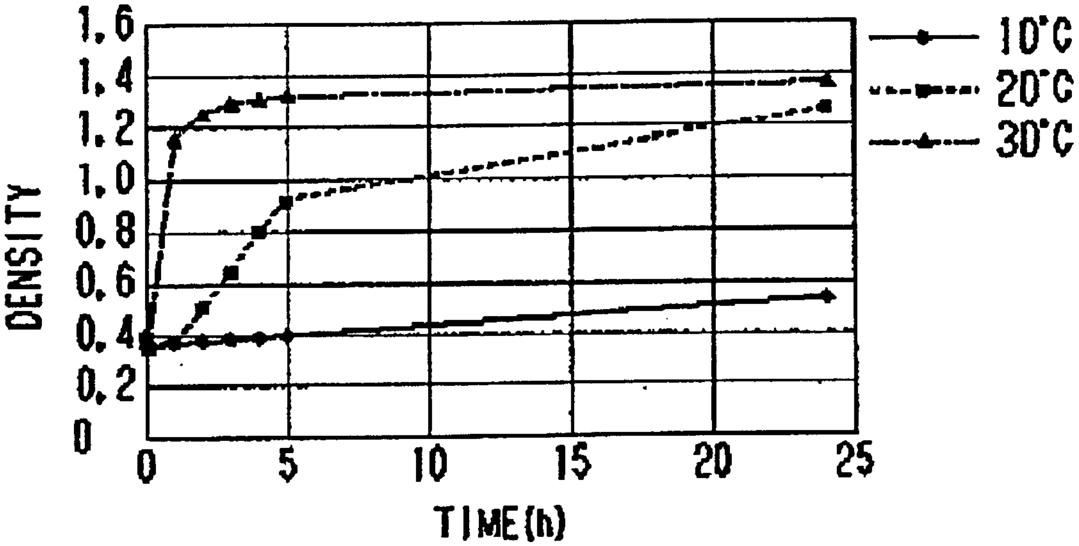
FIG. 3 is a graph illustrating the relationship between time elapsed and color density in a first example.

FIG. 3 is a graph illustrating the color density change of the initialized part according to time elapsed when the temperature indicator 1 is left in the environment of 10° C., 20° C., and 30° C. The density of the initialized part is determined using model 938 (product of x-Rite co.) after initialization. In the result, the inventors confirms that the initialize part is decolored, the colorization is promoted slowly at temperature 10° C., but is promoted quickly at temperatures 20° C. and 30° C. as compared with 10° C.

<Example 2>

| | |
|---|---|
| Leuco Dye A: "Blue 63" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: p-hydroxy phenethyl alcohol | 1 part by weight |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.; 5 parts by weight).

The temperature indicating material 4 is prepared as follows: first, a coating solution is prepared by completely dissolving a binder resin of a 7:5 mixed solvent of methyl ethyl ketone and toluene, adding the leuco dye A, the developer B, the reversible material C, and the temperature characteristic controller D to the resulting resin solution, charging glass beads of about diameter 3 mm to the resulting mixture to a height of the liquid surface, and stirring the mixture for about 1 hours in a paint shaker. The coating solution thus obtained is applied to PET of 38 μm thick by a bar coater followed by distillation of the solvent at about 70° C., whereby the texture indicating material 4 of 15 μm thick is prepared.

Figure 4:
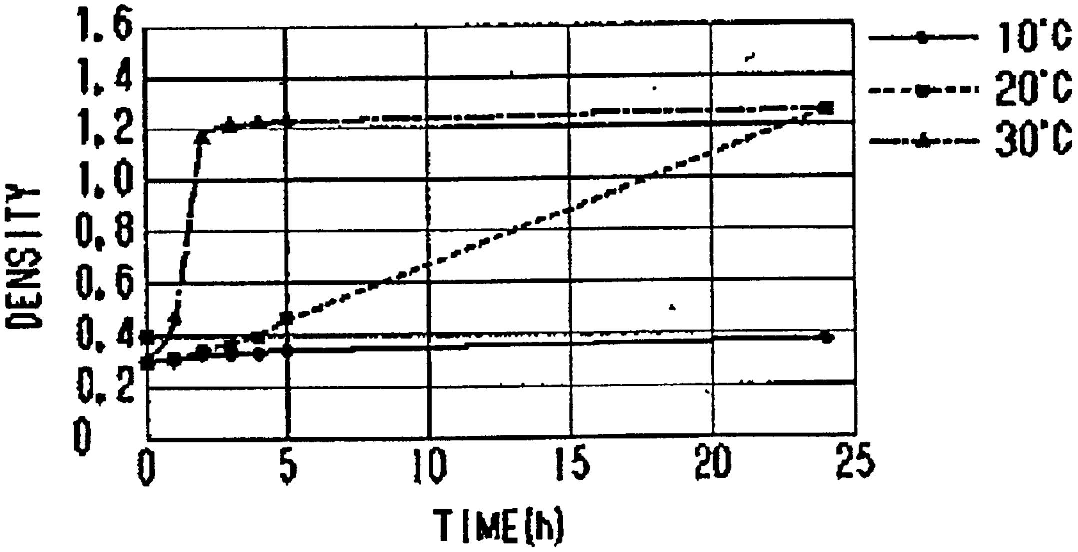
FIG. 4 is a graph illustrating the relationship between time elapsed and color density in a second example.

FIG. 4 is a graph illustrating the color density change of the initialized part according to time elapsed when the temperature indicator 1 is left in the environment of 10° C., 20° C., and 30° C. In the result, the inventors confirms that the initialize part is decolored, the colorization is promoted slowly at temperature 10° C., but is promoted with different speed at temperatures 20° C. and 30° C. depending on the temperature.

<Example 3>

| | |
|---|---|
| Leuco Dye A: "Blue 63" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: 2-hydroxy benzyL alcohol | 3 parts by weight |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.: 5 parts by weight).

Figure 5:
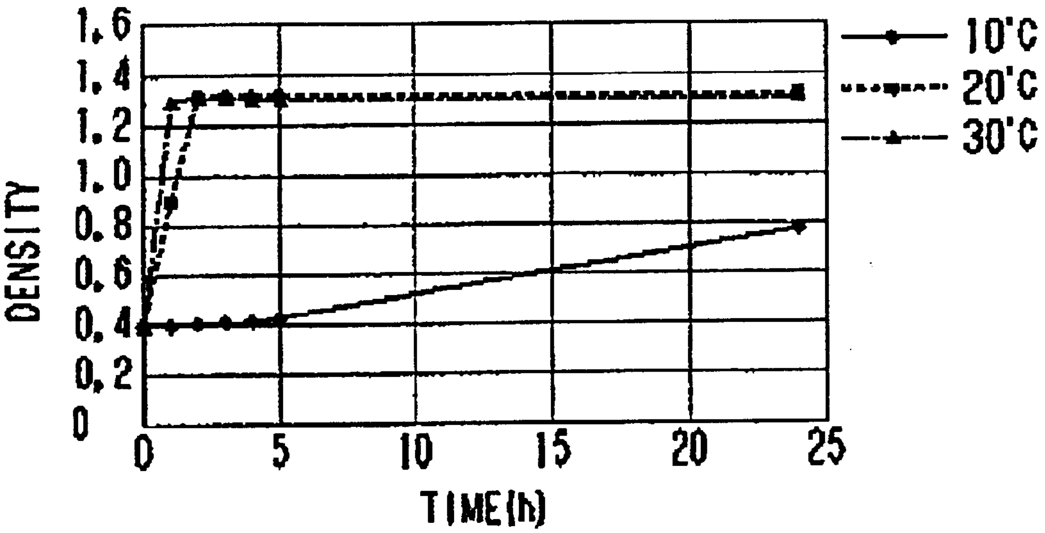
FIG. 5 is a graph illustrating the relationship between time elapsed and color density in a third example.

FIG. 5 is a graph illustrating the color density change of the initialized part according to time elapse when the temperature indicator 1 is left in the environment of 10° C., 20° C., and 30° C. In the result, the inventors confirms that the initialized (decolored) state is kept at temperature 10° C. for 5 hours and the colorization is promote slowly, but the colorization is promoted quickly at temperatures 20° C. and 30° C. as compared with 10° C.

<Example 4>

| | |
|---|---|
| Leuco Dye A: "Blue 63" (trade name; product of Yamamoto Chemicals, Inc.) | 1 part by weight |
| Developer B: Propyl gallate | 1 part by weight |
| Reversible material C; Pregnenolone | 10 parts by weight |
| Temperature characteristic controller D: vanilly alcohol | 1 parts by weight |

The inventors of the present invention make a temperature indicator 1 like showing in FIG. 2, which is similar to the example 1, by dispersing the above mentioned temperature indicating material into the binder resin: polyurethane resin; DAIFERAMINE MAU-5022 (product of Dainichi Seika Color & Chemicals Mfg. co.: 5 parts by weight).

Figure 6:
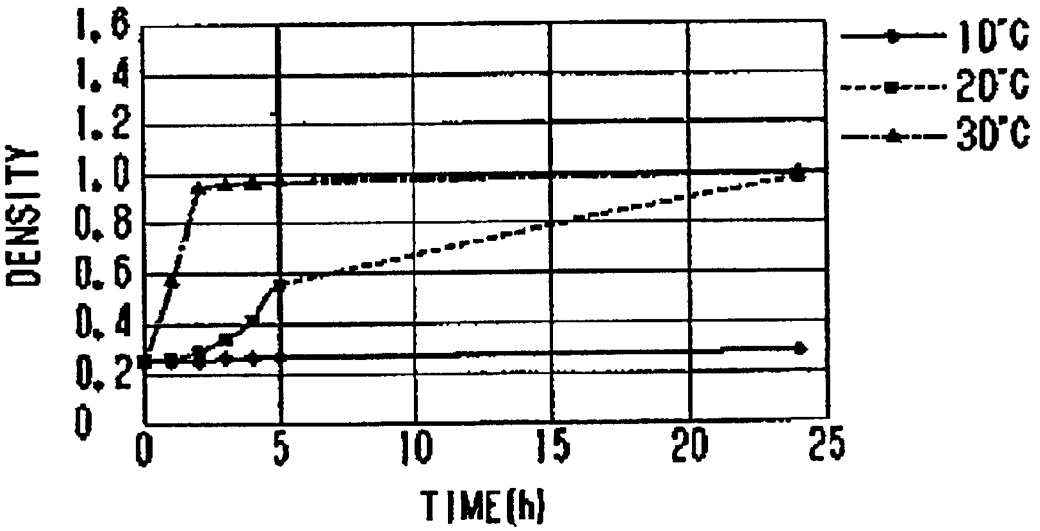
FIG. 6 is a graph illustrating the relationship between time elapsed and color density in a fourth example.

FIG. 6 is a graph illustrating the color density change of the initialized part according to time elapsed when the temperature indicator 1 is left is the environment of 10° C., 20° C., and 30° C. In the result, the inventors confirms that the initialized (decolored) state is kept at temperature 10° C., but the colorization is promoted with different speed at temperatures 20° C. and 30° C. depending on the temperature.

<Example 5>

| | |
|---|---|
| Leuco Dye A: "GN-2" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: Piperonyl alcohol | 3 parts by weight |

The inventors of the present invention make a temperature indicator 1 like showing in FIG. 2, which is similar to the example 1, by dispersing the above mentioned temperature indicating material into the binder resin: styrene methacryate copolymer: methacrylic acid 10% (5 parts by weight).

Figure 7:
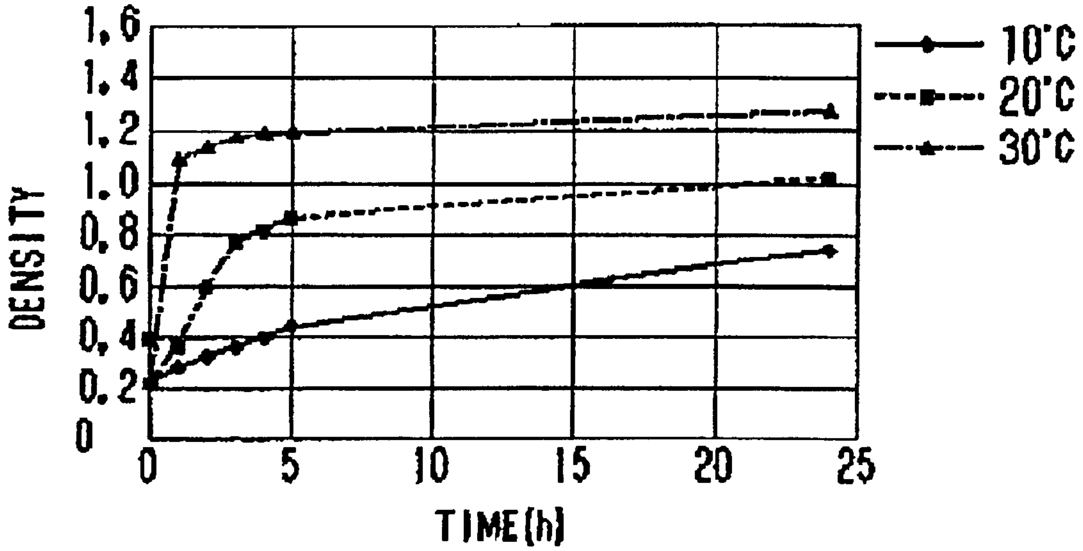
FIG. 7 is a graph illustrating the relationship between time elapsed and color density in a fifth example.

FIG. 7 is a graph illustrating the color density change of the initialized part according to time elapsed when the temperature indicator 1 is left in the environment of 10° C., 20° C., and 30° C. In the result, the inventors confirms that the colorization is promoted gradually at temperature 10° C., and is promoted faster and faster as the temperature is higher like at temperatures 20° C. and 30° C.

<Example 6>

| | |
|---|---|
| Leuco Dye A: "GN-2" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: benzoin | 5 parts by weight |

The inventors of the present invention make a temperature indicator 1 like showing in FIG. 2 which is similar to the example 1, by dispersing the above mentioned temperature indicating material into the binder sin: styrene methacryate copolymer: methacrylic acid 10% (5 parts by weight).

Figure 8:
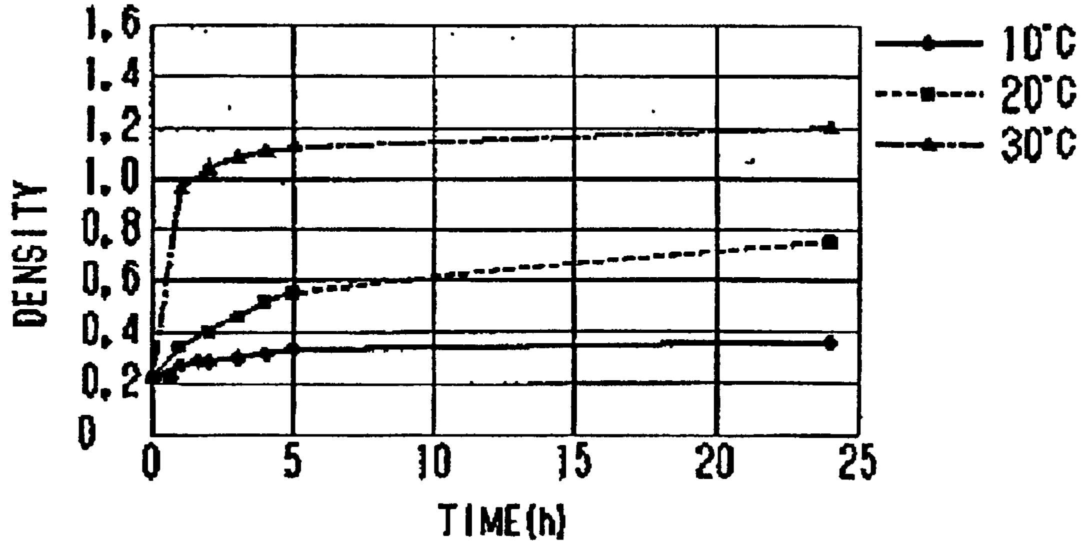
FIG. 8 is a graph illustrating the relationship time elapsed and color density in a sixth example.

FIG. 8 is a graph illustrating the color density change of the initialized part according to time elapse when the temperature indicator 1 is left in the environment of 10° C., 20° C., and 30° C. In the result, the inventors confirms that the colorization is promoted little few at temperature 10° C., is promoted gradually at temperature 20° C., and is printed quickly at temperatures 30° C.

<Example 7>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: benzhydrol | 5 parts by weight |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.: 5 parts by weight).

Figure 9:
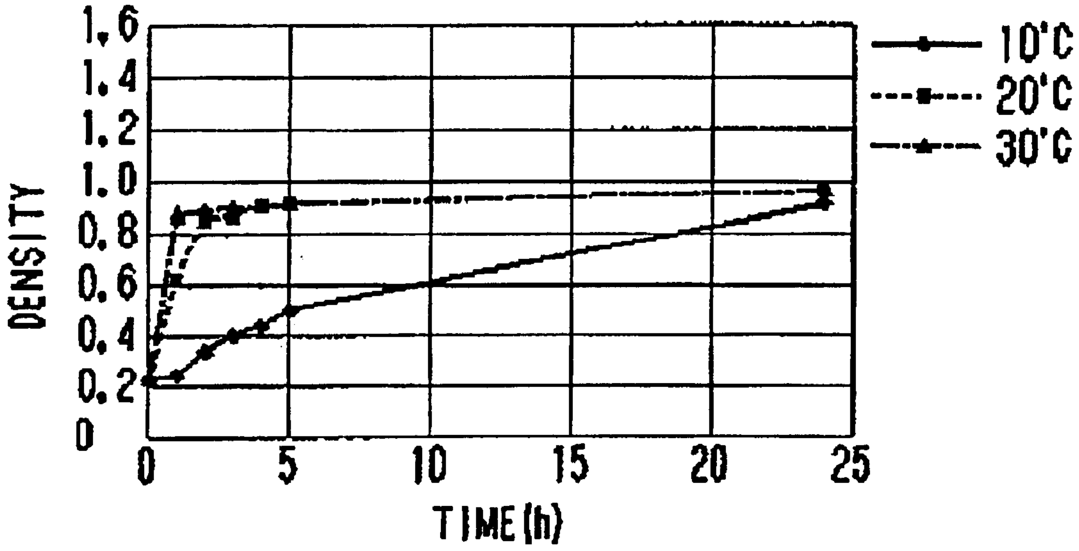
FIG. 9 is a graph illustrating the relationship been time elapsed and color density in a seventh example.

FIG. 9 is a graph illustrating the color density change of the initialized part according to time elapsed when the temperature indicator 1 is left in the environment of 10° C., 20° C., and 30° C. In the result, the inventors confirms that the colorization is prompted gradually at temperature 10° C., and is promoted quickly at temperatures 20° C. and 30° C.

<Example 8>

| | |
|---|---|
| Leuco Dye A: "Blue 63" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: Triphenyl metanol | 5 parts by weight |

The inventors of the present invention make a temperature indicator 1 like showing in FIG. 2, which is similar to the example 1., by dispersing the above mentioned temperature indicating material into the binder resin; polyurethane resin. DAIFERAMINE MAU-5022 (product of Dainichi Seika Color & Chemicals Mfg. co.: 5 parts by weight).

Figure 10:
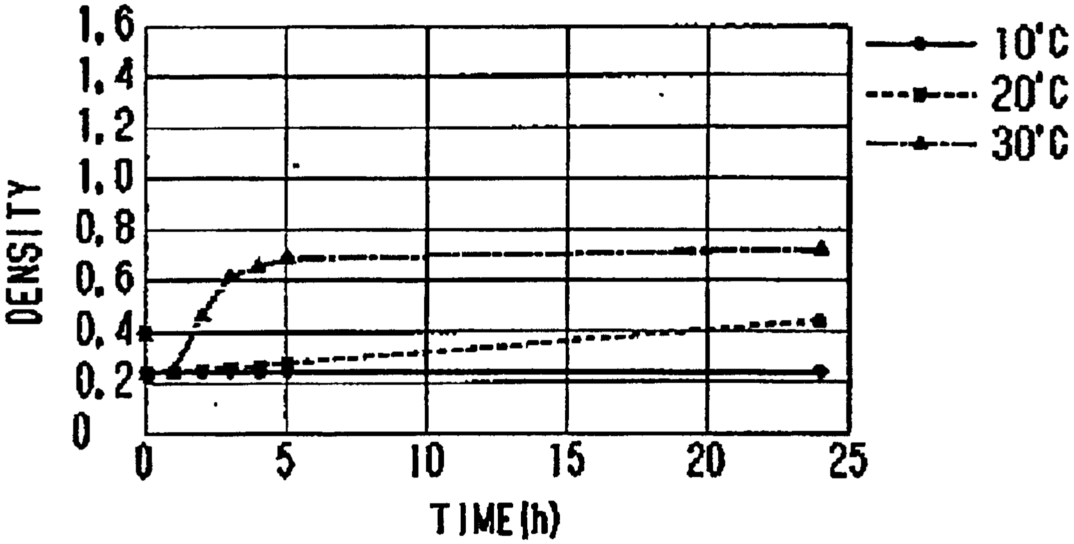
FIG. 10 is a graph illustrating the relationship between time elapsed and color density in a eighth example.

FIG. 10 is a graph illustrating the color density change of the initialized part according to time elapsed when the temperature indicator 1 is left in the environment of 10° C., 20° C., and 30° C. In the result, the inventors confirms that the colorization is promoted little few at temperature 10° C., is promoted gradually at temperature 20° C., and is promoted quickly at temperature 30° C.

<Example 9>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: methyl benzylate | 5 parts by weight |

The inventors of the present invention make a temperature indicator 1 like showing in FIG. 2, which is similar to the example 1, by dispersing the mentioned temperature indicating material into the binder resin: polyurethane resin: DAIFERMAINE MAU-5022 (product of Dainichi Seika Color & Chemicals Mfg. co: 5 parts by weight).

Figure 11:
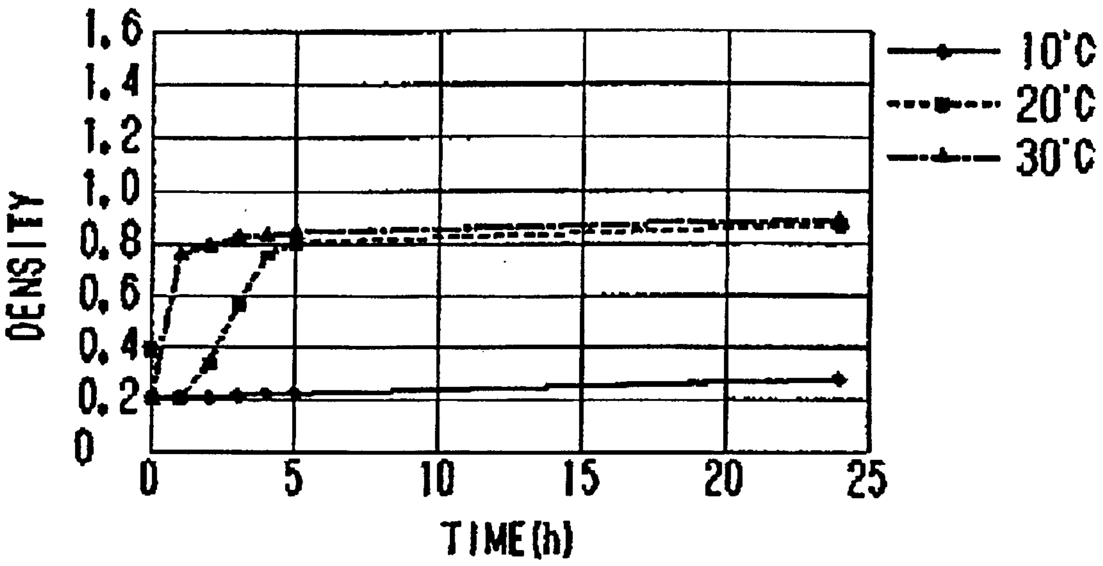
FIG. 11 is a graph illustrating the relationship between time elapsed and color density in a ninth example.

FIG. 11 is a graph illustrating the color density change of the initialized part according to time elapsed when the temperature indicator 1 is left in the environment of 10° C., 20° C., and 30° C. In the result, the inventors confirms that the colorization is promoted little few at temperature 10° C., and is promoted quickly at temperatures 20° C. and 30° C.

<Example 10>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: benzyl DL-mandelate | 5 parts by weight |

The inventors of the present invention make a temperature indicator 1 like showing in FIG. 2, which is similar to the example 1, by dispersing the above mentioned temperature indicating material into the binder resin: polyurethane resin; DAIFERAMINE MAU-5022 (product of Dainichi Seika Color & Chemicals Mfg. co.: 5 parts by weight).

Figure 12:
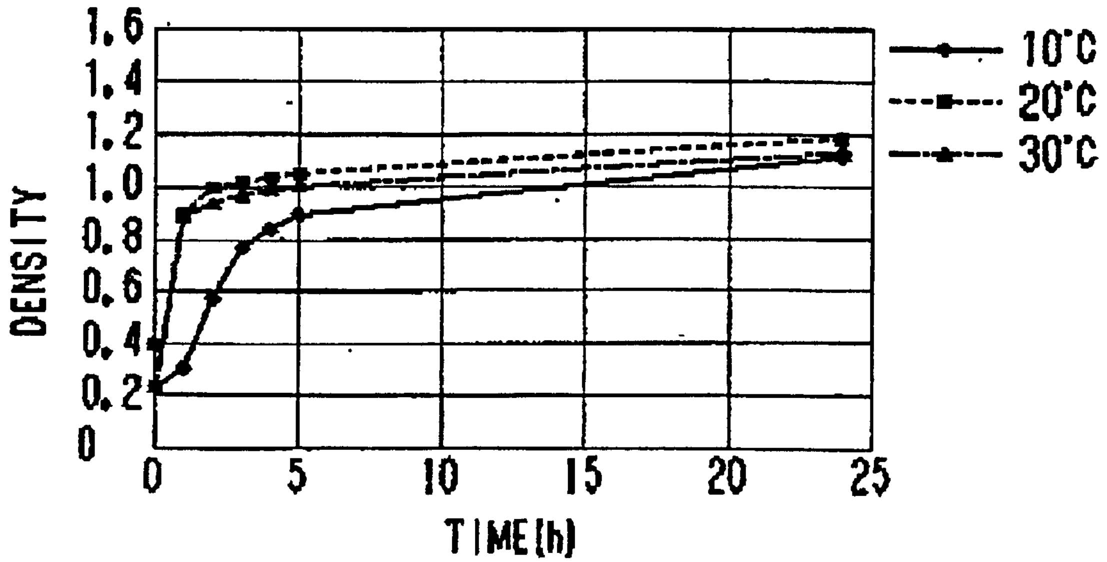
FIG. 12 is a graph illustrating the relationship between time elapsed and color density in a tenth example.

FIG. 12 is a graph illustrating the color density change of the initialized part according to time elapsed when the temperature indicator 1 is left in the environment of 10° C., 20° C., and 30° C. In the result, the inventors confirms that the colorization is promoted quickly at all temperatures 10° C., 20° C. and 30° C.

<Example 11>

| | |
|---|---|
| Leuco Dye A: "GN2" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: Benzyl | 5 parts by weight |

The inventors of the present invention make a temperature indicator 1 like showing in FIG. 2, which is similar to the example 1, by dispersing the above mentioned temperature indicating material into the binder resin: styrene methacrylic acid copolymer: methacrylic acid 10% (4 parts by weight).

Figure 13:
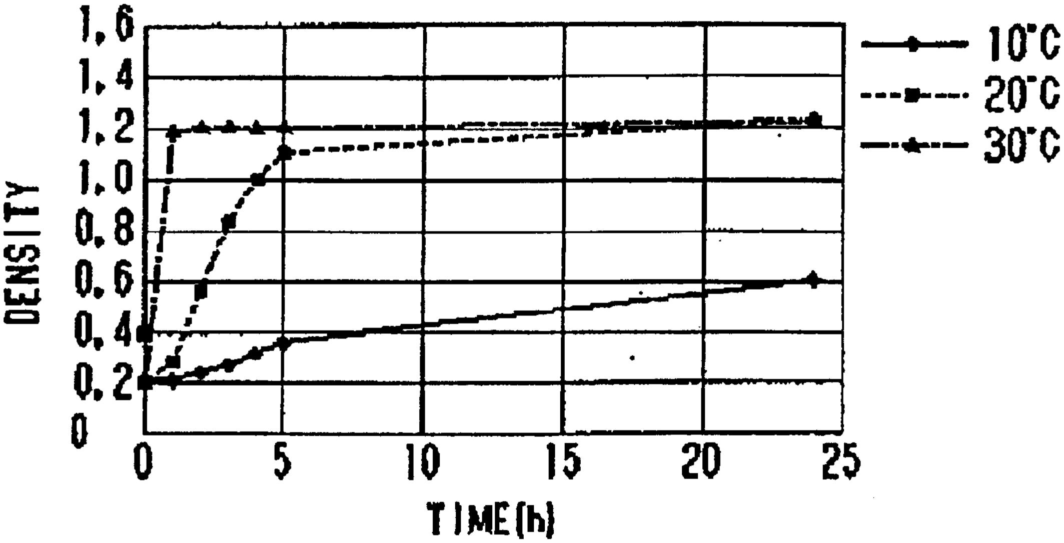
FIG. 13 is a graph illustrating the relationship between time elapsed and color density in a eleventh example.

FIG. 13 is a graph illustrating the color density change of the initialized part according to time elapsed when the temperature indicator 1 is left in the environment of 10° C., 20° C., and 30° C. In the result, the inventors confirms that the colorization is promoted gradually at temperature 10° C., and is promoted quickly at temperatures 20° C. and 30° C.

<Example 12>

| | |
|---|---|
| Leuco Dye A: "GN-2" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: Benzoin isopropyl ether | 5 parts by weight |

The inventors of the present invention make a temperature indicator 1 like showing in FIG. 2, which is similar to the example 1, by dispersing the above mentioned temperature indicating material into the binder resin: styrene methacryate copolymer: methacrylic acid 10% (4 parts by weight).

Figure 14:
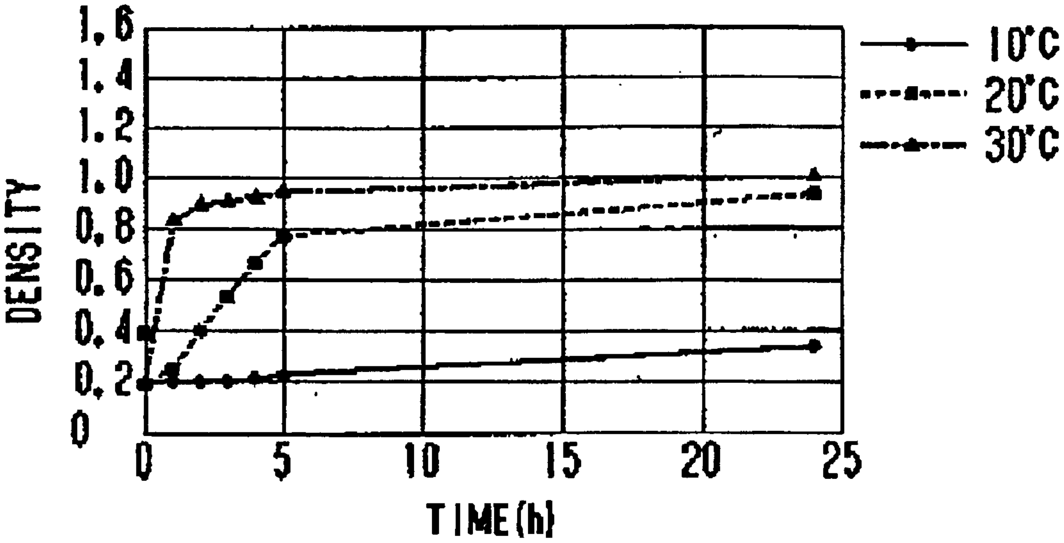
FIG. 14 is a graph illustrating the relationship between time elapsed and color density in a twelfth example.

FIG. 14 is a graph illustrating the color density change of the initialized part according to time elapsed when the temperature indicator 1 is left in the environment of 10° C., 20° C., and 30° C. In the result, the inventors confirms that the colorization is promoted slowly at temperature 10° C., but promoted quickly at temperatures 20° C. and 30° C.

<Example 13>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: Benzilic phenyl ketone | 5 parts by weight |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.: 5 parts by weight).

Figure 15:
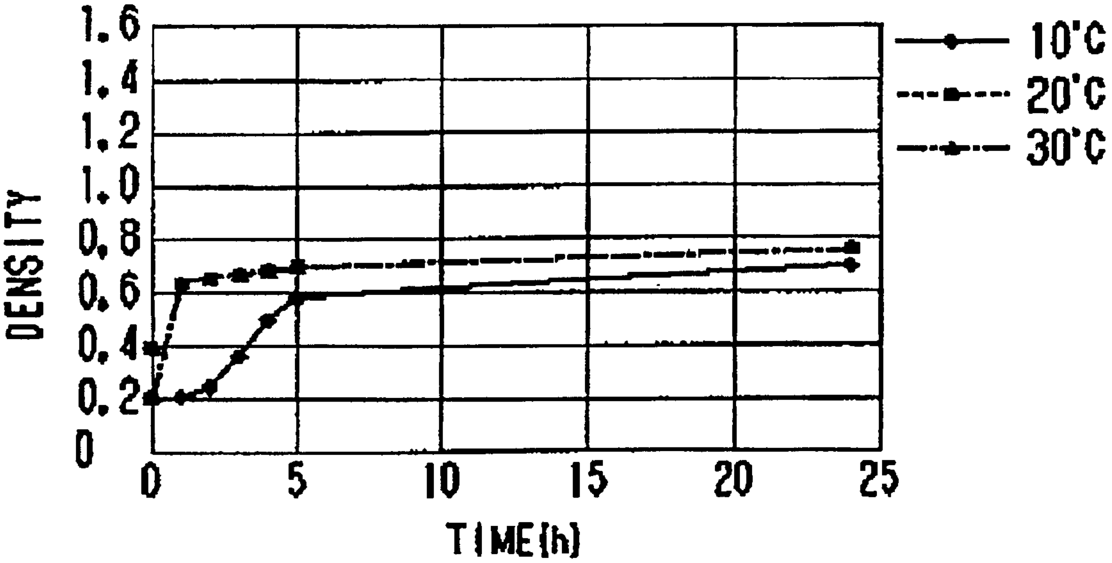
FIG. 15 is a graph illustrating the relationship between time elapsed and color density in a thirteenth example.

FIG. 15 is a graph illustrating the color density change of the initialized part according to time elapsed when the temperature indicator 1 is left in the environment of 10° C., 20° C., and 30° C. In the result, the inventors confirms that the colorization is started quickly after 2 hour at temperature 10° C., and is promoted quickly at textures 20° C. and 30° C.

<Example 14>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: Methyl 2-benzoyl benzoate | 5 parts by weight |

The inventors of the present invention make a temperature indicator 1 like showing in FIG. 2, which is similar to the example 1, by dispersing the above mentioned temperature indicating material into the binder resin: polyurethane resin: DAIFERAMINE MU-5022 (product of Dainichi Seika Color & Chemicals Mfg. co.: 5 parts by weight).

Figure 16:
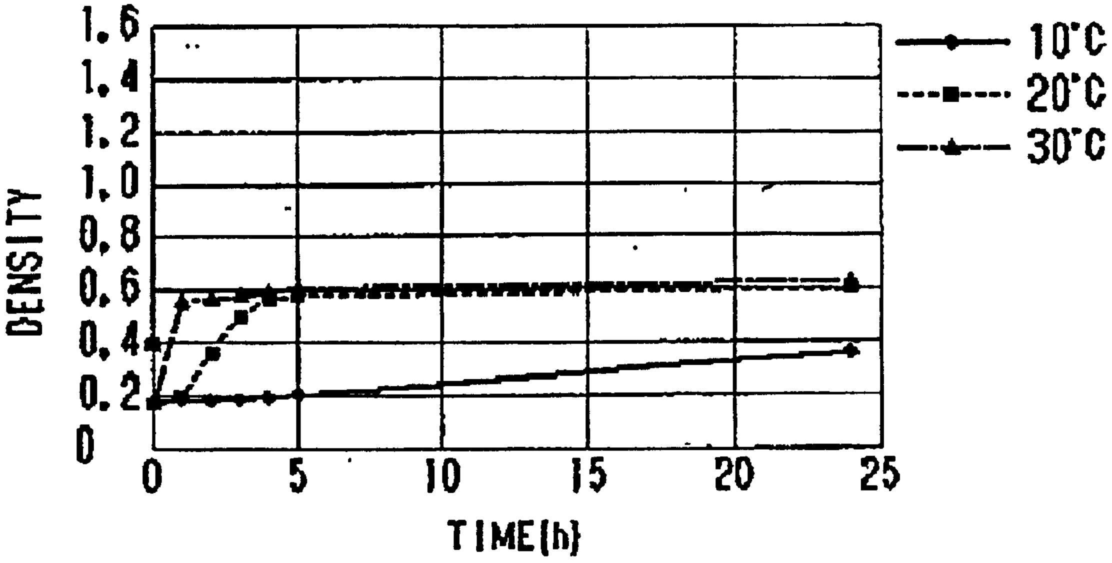
FIG. 16 is a graph illustrating the relationship between time elapsed and color density in a fourteenth example.

FIG. 16 is a graph illustrating the color density change of the initialized part according to time elapsed when the temperature indicator 1 is left in the environment of 10° C., 20° C., and 30° C. In the result, the inventors confirms that the colorization is promoted slowly at temperature 10° C., but is promoted quickly at temperatures 20° C. and 30° C.

<Example 15>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: Benzyl 2-naphthyl ether | 5 parts by weight |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.: 5 parts by weight).

Figure 17:
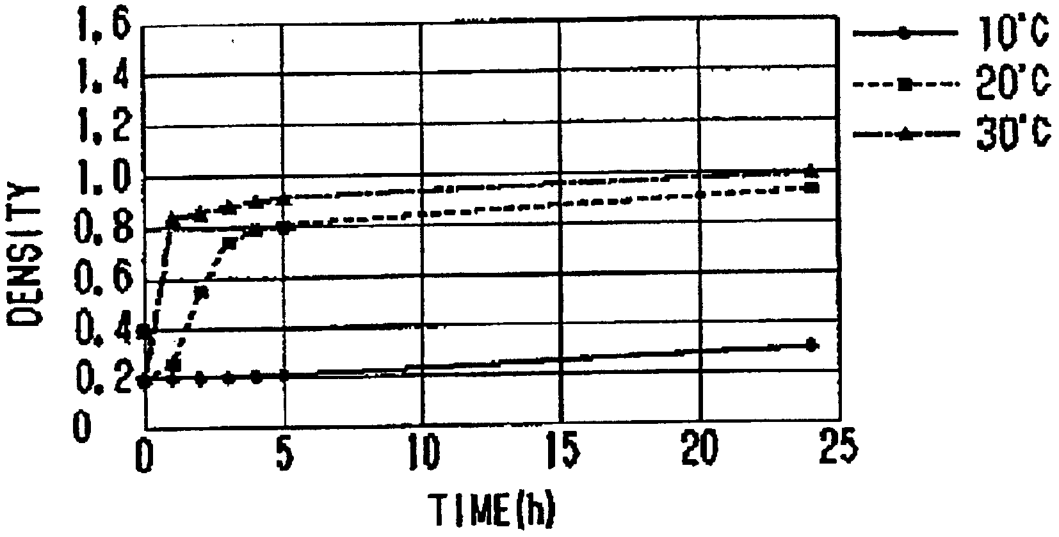
FIG. 17 is a graph illustrating the relationship between to elapsed and color density in a fifteenth example.

FIG. 17 is a graph illustrating the color density change of the initialized part according to time elapsed when the temperature indicator 1 is left in the environment of 10° C., 20° C., and 30° C. In the result, the inventors confirms that the colorization is promoted little few at temperature 10° C., but is promoted quickly at temperatures 20° C. and 30° C.

<Example 16>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: 1-benzyloxy-2-methoxy-4-(1-propenyl)benzene | 5 parts by weight |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.: 5 parts by weight).

Figure 18:
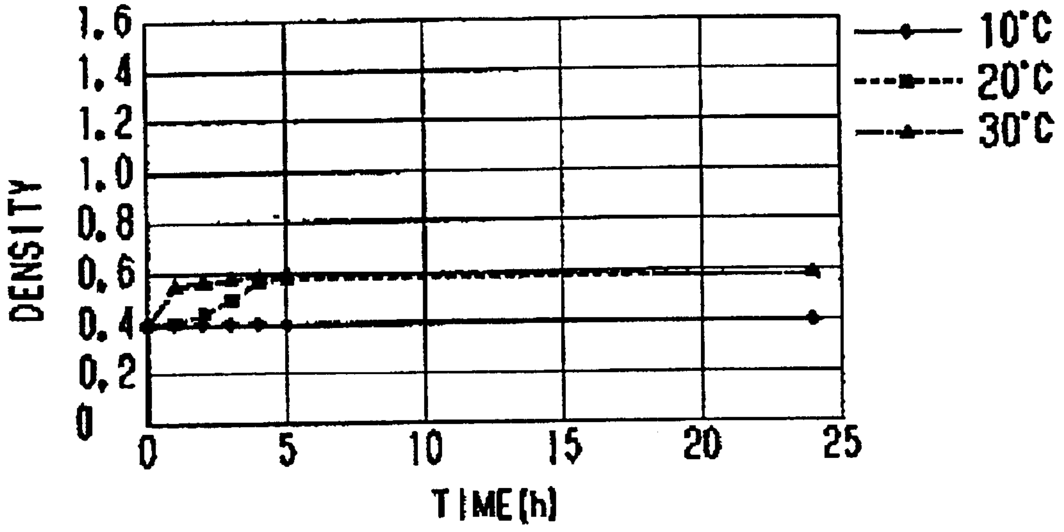
FIG. 18 is a graph illustrating the relationship between time elapsed and color density in a sixteenth example.

FIG. 18 is a graph illustrating the color density change of the initialized part according to time elapsed when the temperature indicator 1 is left in the environment of 10° C., 20° C., and 30° C. In the result, the inventors confirms that the colorization is promoted little few at temperature 10° C., but is promoted quickly at temperatures 20° C. and 30° C.

<Example 17>

| | |
|---|---|
| Leuco Dye A: "Blue 63" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: 4-Benzyl biphenyl | 5 parts by weight |

The inventors of the present invention make a temperature indicator 1 like showing in FIG. 2, which is similar to the example 1, by dispersing the above mentioned temperature indicating material into the binder resin: polyurethane resin; DAIFERAMINE MAU-5022 (product of Dainichi Seika Color & Chemicals Mfg. co.: 5 parts by weight).

Figure 19:
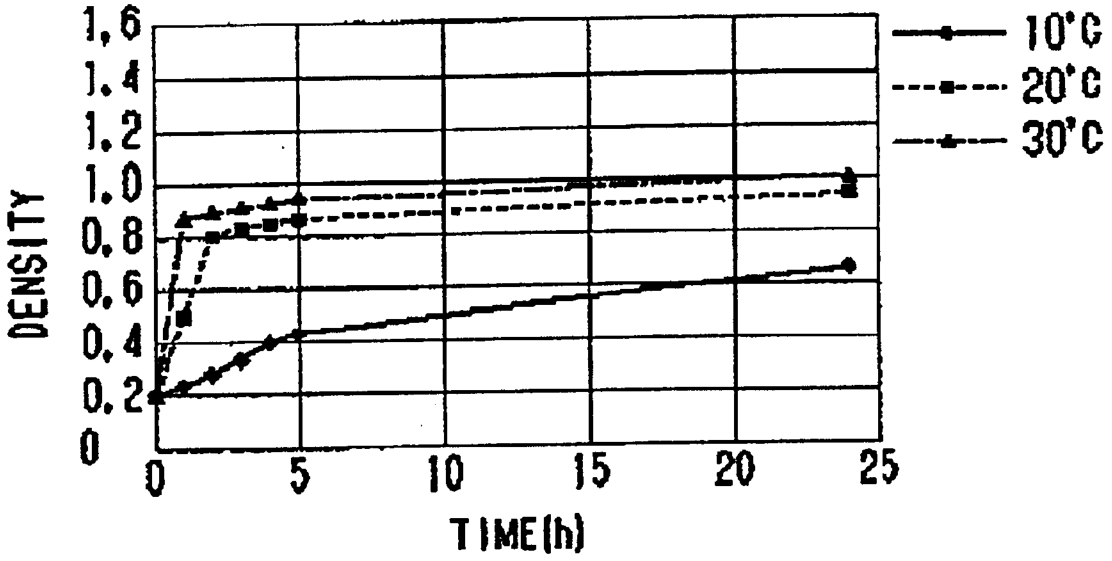
FIG. 19 is a graph illustrating the relationship between time elapsed and color density in a seventeenth example.

FIG. 19 is a graph illustrating the color density change of the initialized part according to time elapsed when the temperature indicator 1 is left in the environment of 10° C., 20° C., and 30° C. In the result, the inventors confirms that the colorization is promoted quickly at temperatures 20° C. and 30° C., and is promoted gradually at temperature 10° C. The inventors also confirms that the colorization is promoted little few at temperatures 0° C. (the temperature indicating material 4 has sensitivity between 0° C. and 10° C.).

<Example 18>

| | |
|---|---|
| Leuco Dye A: "Blue 63" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: m-terphenyl | 5 parts by weight |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.: 5 parts by weight).

Figure 20:
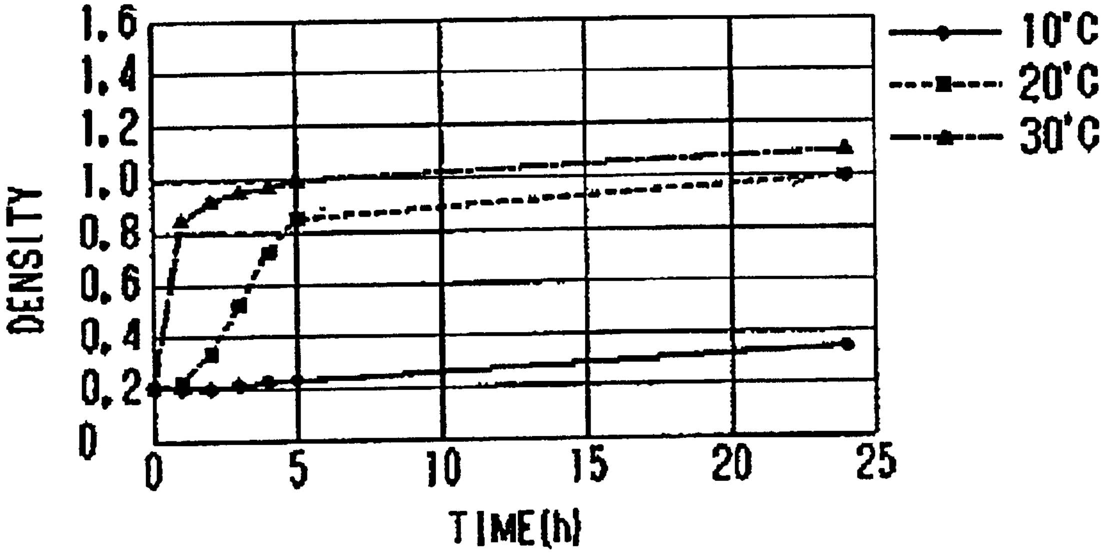
FIG. 20 is a graph illustrating the relationship between time elapsed and color density in a eighteenth example.

FIG. 20 is a graph illustrating the color density change of the initialized part according to time elapsed when the temperature indicator 1 is left in the environment of 10° C., 20° C., and 30° C. In the result, the inventors confirms that the colorization is promoted little few at temperature 10° C., but is promoted quickly at temperatures 20° C. and 30° C.

<Comparative example 1>

| | |
|---|---|
| Leuco Dye A: "GN-2" (trade name; product of Yamamoto Chemicals, Inc.) | 1 part by weight |
| Developer B: Propyl gallate | 1 part by weight |
| Reversible material C: Pregnenolone | 10 parts by weight |
| Temperature characteristic controller D: Not added | |

The inventors of the present invention make a temperature indicator 1 like showing in FIG. 2, which is similar to the example 1, by dispersing the above mentioned temperature indicating material into the binder resin: styrene methacryate copolymer: methacrylic acid 10% (4 parts by weight).

Figure 21:
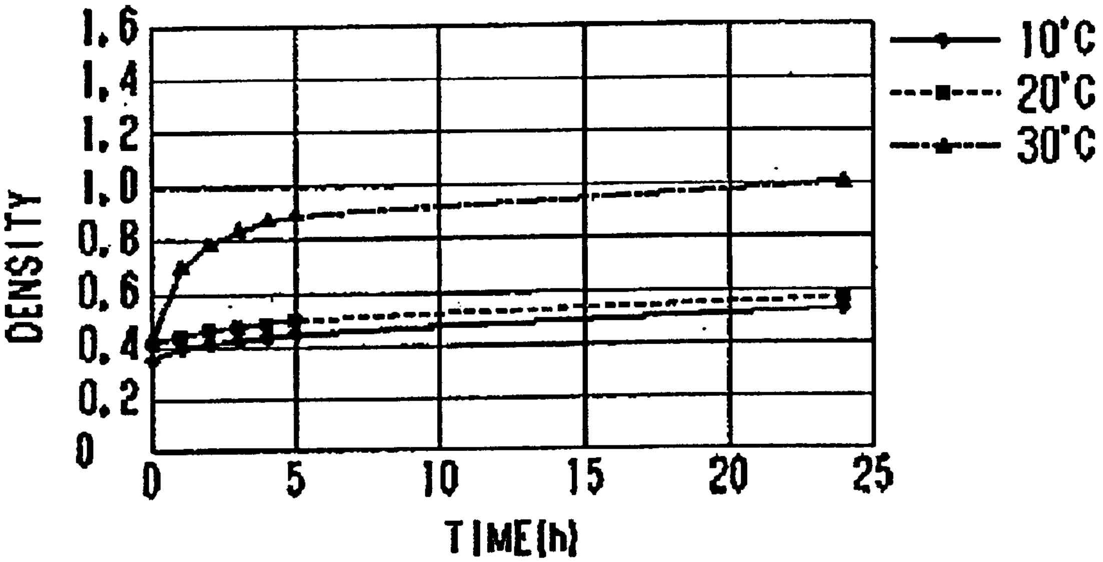
FIG. 21 is a graph illustrating the relationship between time elapsed and color density in a first comparative example.

FIG. 21 is a graph illustrating the color density change of the initialized part according to time elapsed when the temperature indicator 1 is left in the environment of 10° C., 20° C., and 30° C. In the result, the inventors confirm that the colorization is promoted slowly at temperatures 10° C. and 20° C. The inventors cannot find the difference of temperature indicating characteristic between 10° C. and 20° C. The inventors also confirm that the colorization is promoted faster at temperature 30° C. than at 10° C. and 20° C., but is promoted slowly as compared with the same of the temperature indicating material 4 including the temperature characteristic controller D.

<Comparative example 2>

| | |
|---|---|
| Leuco Dye A: "Blue 63" (trade name; product of Yamamoto Chemicals, Inc.) | 1 part by weight |
| Developer B: Propyl gallate | 1 part by weight |
| Reversible material C: Pregnenolone | 10 parts by weight |
| Temperature cbaracteristic controller D: Not added | |

The inventors of the present invention make a temperature indicator 1 like showing in FIG. 2, which is similar to the example 1, by dispersing the above mentioned temperature indicating material into the binder resin: polyurethane resin: DAIFERAMINE MAU-5022 (product of Dainichi Seika Color & Chemicals Mfg. co.: 5 parts by weight).

Figure 22:
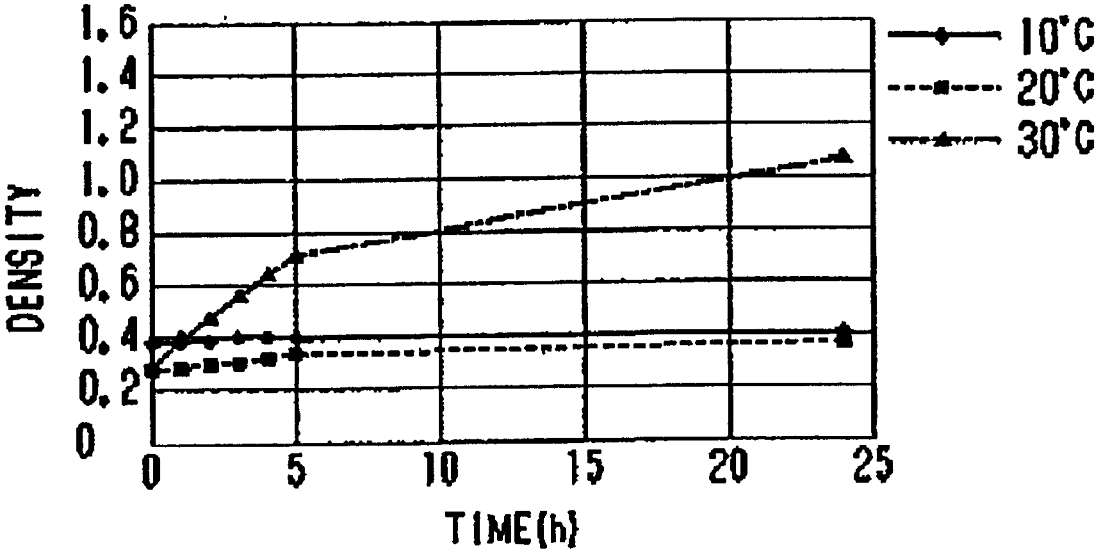
FIG. 22 is a graph illustrating the relationship between time elapsed and color density in a second comparative example.

FIG. 22 is a graph illustrating the color density change of the initialized part according to time elapsed when the temperature indicator 1 is left in the environment of 10° C., 20° C., and 30° C. In the result, the inventors confirms that the colorization is promoted slowly at temperatures 10° C. and 20° C. The inventors cannot find the difference of temperature indicating characteristic between 10° C. and 20° C. The inventors also confirm that the colorization is promoted faster at temperature 30° C. than at 10° C. and 20° C., but is promoted slowly as compared with the same of the temperature indicating material 4 including the temperature characteristic controller D.

<Comparative example 3>

| | |
|---|---|
| Leuco Dye A: "Blue 63" (trade name; product of Yamamoto Chemicals, Inc.) | 1 part by weight |
| Developer B: Bisphenol S | 1 part by weight |
| Reversible material C: Pregnenolone | 10 parts by weight |
| Temperature characteristic controller D: Not added | |

The inventors of the present invention make a temperature indicator 1 like showing in FIG. 2, which is similar to the example 1, by dispersing the above mentioned temperature indicating material into the binder resin: polyurethane resin; DAIFERAMINE MAU-5022 (product of Dainichi Seika Color & Chemicals Mfg. co.: 5 parts by weight).

Figure 23:
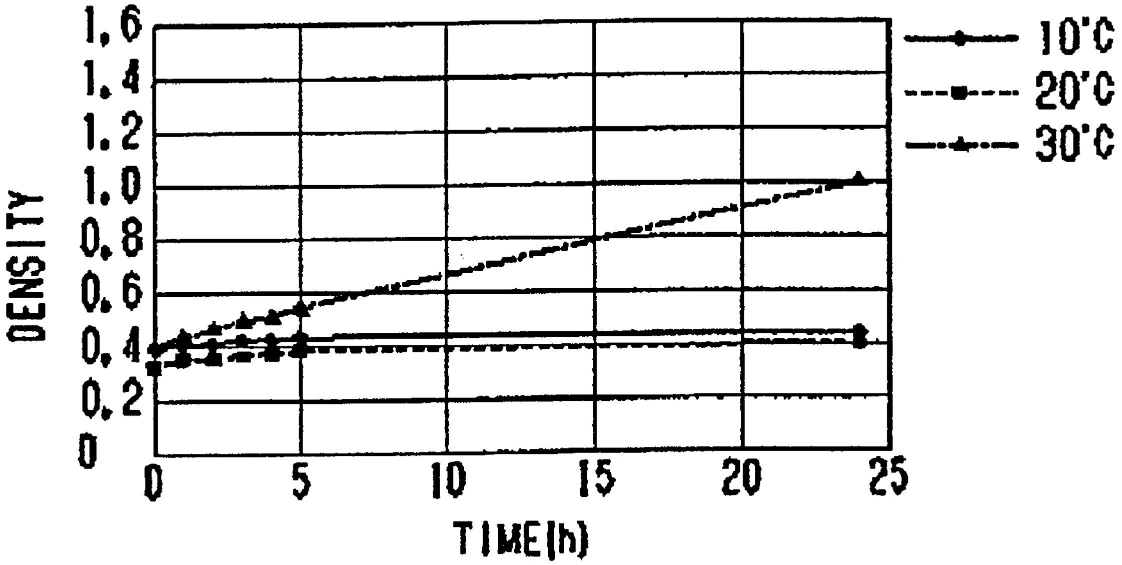
FIG. 23 is a graph illustrating the relationship between time elapsed and color density in a third comparative example.

FIG. 23 is a graph illustrating the color density change of the initialized part according to time elapsed when the temperature indicator 1 is left in the environment of 10° C., 20° C., and 30° C. In the result, the inventors confirms that the colorization is promoted slowly at temperatures 10° C. and 20° C. The inventors cannot find the difference of temperature indicating characteristic between 10° C. and 20° C. The inventors also confirm that the colorization is promoted faster at temperature 30° C. than at 10° C. and 20° C., but is promoted slowly as compared with the same of the temperature indicating material 4 including the temperature characteristic controller D.

<Comparative example 4>

| | |
|---|---|
| Leuco Dye A: "GN-2" (trade name; product of Yamamoto Chemicals, Inc.) | 1 part by weight |
| Developer B: Propyl gallate | 1 part by weight |
| Reversible material C: Pregnenolone | 10 parts by weight |
| Phase separation controller: 1-docosanol | 5 parts by weight |

The inventors of the present invention make a temperature indicator 1 like showing in FIG. 2, which is sill to the example 1, by dispersing the above mentioned temperature indicating material into the binder resin: styrene methacrylic acid copolymer: methacrylic acid 10% (4 parts by weight).

Figure 24:
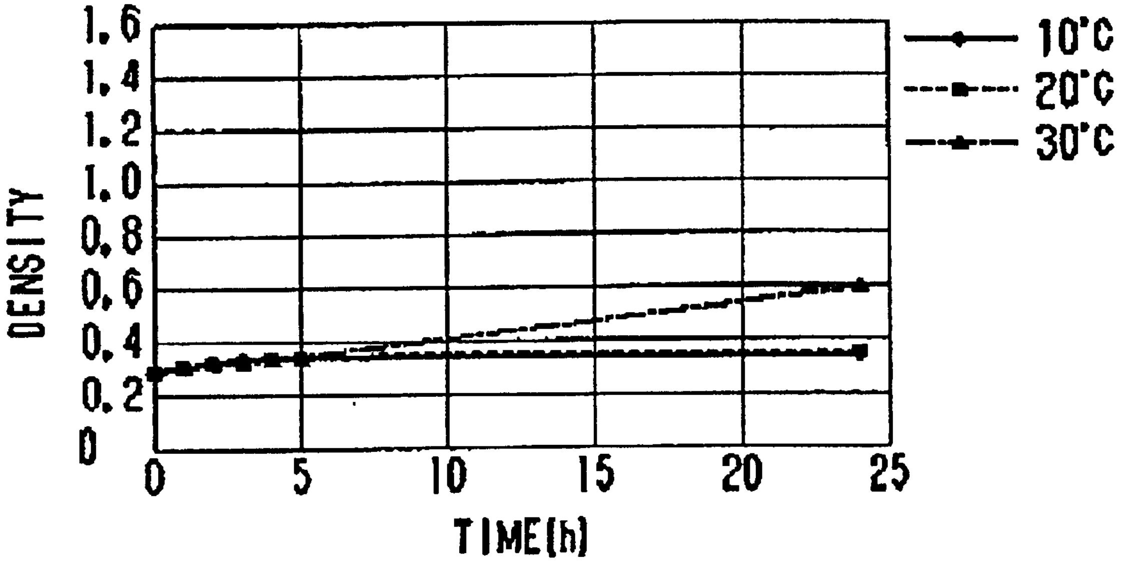
FIG. 24 is a graph illustrating the relationship between time elapsed and color density in a fourth comparative example.

FIG. 24 is a graph illustrating the color density change of the initialized part according to time elapsed when the temperature indicator 1 is left in the environment of 10° C., 20° C., and 30° C. In the result, the inventors confirms that the decolored status of the temperature indicating material 4 is kept at temperatures 10° C. and 20° C. and the colorization is promoted slowly at temperature 30° C. The inventors also confirm that the colorization speed is not drastically changed at the changing point (between 20° C. to 30° C.).

<Comparative example 5>

| | |
|---|---|
| Leuco Dye A: "GN-3" (trade name; product of Yamamoto Chemicals, Inc.) | 1 part by weight |
| Developer B: Propyl gallate | 1 part by weight |
| Reversible material C: Pregnenolone | 10 parts by weight |
| Phase separation controller: Cyclododecanol | 5 parts by weight |

The inventors of the present invention make a temperature indicator 1 like showing in FIG. 2, which is similar to the example 1, by dispersing the above mentioned temperature indicating material into the binder resin: styrene methacryate copolymer: methacrylic acid 10% (4 parts by weight).

Figure 25:
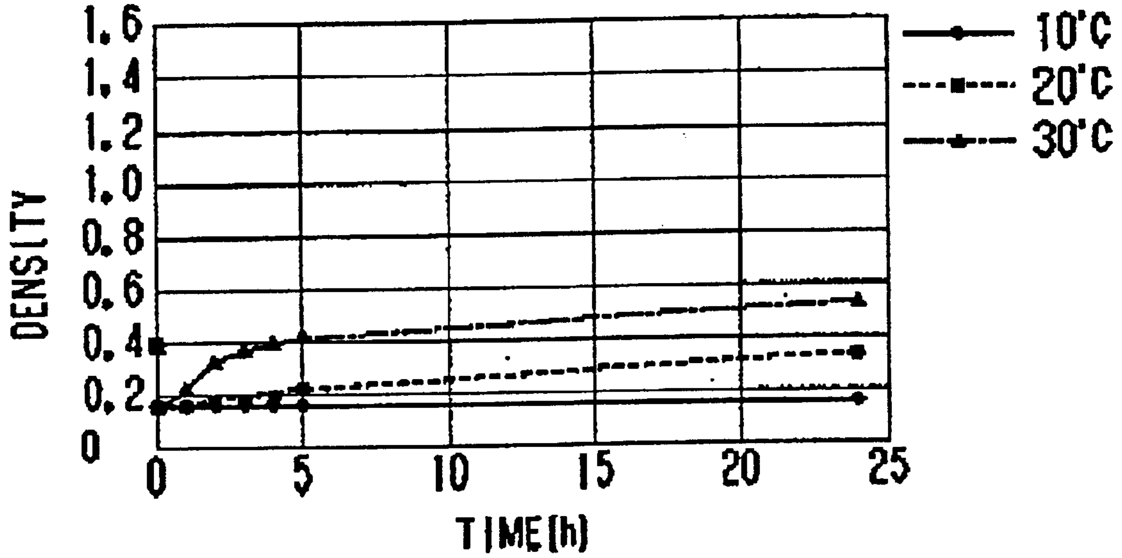
FIG. 25 is a graph illustrating the relationship between time elapsed and color density in a fifth comparative example.

FIG. 25 is a graph illustrating the color density change of the initialized part according to time elapse when the temperature indicator 1 is left in the environment of 10° C., 20° C., and 30° C. In the result, the inventors confirms that the decolored status of the temperature indicating material 4 is kept at temperature 10° C., and the colorization is promoted slowly at temperatures 20° C. and 30° C. The inventors also confirm that the colored density of comparative example is lower than the same of the temperature indicating material 4 not including the phase separation controller.

The result of the comparative examples 1 to 4 shows that the temperatures in which the colorization speed is drastically changed (response temperature) are not different between the examples not using the phase separation controller and using 1-docosanol. This is because the response temperature is set around 72° C. to be melting point of 1-docosanol, since the 1-docosanol changes phase separation speed around its melting point, so that the response temperature of the system not using phase separation controller or using 1-docosanol cannot be changed less than 30° C.

The result of the comparative examples 1 to 3 and 5 shows that cyclododecanol improves initialization characteristic and changes the response temperature to 10° C. to 20° C. Because the melting point of cyclododecanol is at 77° C., it is apparent that cyclododecanol does not change the phase separation around its melting point. Thus, cyclododecanol can be used as the temperature characteristic controller D with respect to the function changing the response temperature. However, the problem of cyclododecanol as the temperature characteristic controller D is low colorization density as compared with the system not using the phase separation controller. Thus, cyclododecanol is not proper for the temperature characteristic controller D. The reason why the colorization density is lower, cyclododecanol keeps the great mutual action to the developer B after phase separation, so that cyclodedecanol prevents the mutual action between the developer B and the leuco dye A.

The temperature characteristic controller D of examples 1 to 18 improves initialization characteristic as compared with the comparative examples 1, 2 and 3 not using the temperature characteristic controller D and changes the response temperature under 20° C. The melting point of the temperature characteristic controller D is: Para-hydroxy phenethyl alcohol: 91° C.; 2-hydroxy benzyl alcohol: 86° C.; vanilly alcohol: 114° C.; Piperonyl alcohol: 53° C.; 134° C.; benzhydrol: 67° C.; Triphenyl methanol: 163° C.; methyl benzilate; 74° C.; benzyl DL-mandelate: 95° C.; Benzyl; 96° C.; Benzoin isopropyl ether: 79° C.; Benzilic phenyl ketone; 56° C.; Methyl 2-benzoyl benzoate: 53° C.; Benzyl 2-naphthyl ether: 101° C.; 1-benzyloxy-2-methoxy-4-(1-propenyly) benzene: 59° C.; 4-Benzyl biphenyl: 86° C.; and m-terphenyl: 86° C. The above temperature characteristic controller D dose not change the phase separation speed around the melting point as same as cyclododecanol. Thus, it is apparent that the temperature characteristic controller D of the present invention causes reversible transformation between crystal and amorphous, or between phase separation and non-phase-separation, with respect to the composition system by its transformation been crystal and amorphous, or between phase separation and non-phase-separation. Also, the temperature indicating material 4 using the temperature characteristic controller D of the present invention has great sensitivity for the temperature, and high colorization density as compared with the same including cyclododecanol. The colorization density of the temperature indicating material 4 using the temperature characteristic controller D of the present invention is almost same or more to the composition system not including the phase separation controller. This is because the temperature characteristic controller D does not keep the great mutual action to the developer B after phase separation, so that the temperature characteristic controller D does not prevent the mutual action between the developer B and the leuco dye A, and that the temperature characteristic controller D is almost same or more to the composition system not including it.

The temperature characteristic controller D of examples 1 to 4 has a phenol hydroxide group causing the mutual action to the leuco dye A and contributing colorization, so that the colorization density of the temperature indicating material 4 using the temperature characteristic controller D is almost same or more to the composition system not including the temperature characteristic controller. The temperature characteristic controller D may be used alone or in admixture.

Table 1 shows the colorization density b before initialization using the thermal head, saturated density a after progress of the colorization at 30° C., and a return ratio % (a/b×100) which divides the saturated density a by the colorization density b.

TABLE 1

| Example<br>Comparative example | Colorization density before initialization | Saturated density | return ratio (%) |
|---|---|---|---|
| Example 1 | 1.46 | 1.38 | 95 |
| Example 2 | 1.44 | 1.27 | 88 |
| Example 3 | 1.44 | 1.34 | 93 |
| Example 4 | 1.27 | 1.01 | 80 |
| Example 5 | 1.45 | 1.35 | 93 |
| Example 6 | 1.48 | 1.25 | 84 |
| Example 7 | 1.11 | 0.99 | 89 |
| Example 8 | 1.09 | 0.85 | 78 |
| Example 9 | 1.17 | 0.95 | 81 |
| Example 10 | 1.12 | 1.18 | 105 |
| Example 11 | 1.55 | 1.23 | 79 |
| Example 12 | 1.47 | 1.19 | 81 |
| Example 13 | 0.89 | 0.77 | 87 |
| Example 14 | 0.81 | 0.64 | 79 |
| Example 15 | 1.22 | 1.11 | 91 |
| Example 16 | 0.80 | 0.62 | 78 |
| Example 17 | 1.20 | 1.13 | 94 |
| Example 18 | 1.15 | 1.13 | 98 |
| Comparative example 1 | 1.47 | 1.19 | 81 |
| Comparative example 2 | 1.30 | 1.11 | 85 |
| Comparative example 3 | 1.57 | 1.33 | 85 |
| Comparative example 4 | 1.33 | 0.83 | 62 |
| Comparative example 5 | 1.12 | 0.75 | 67 |

The return ratios of the comparative examples 1, 2, and 3 not including the temperature characteristic controller D are 81%, 85%, and 85%, respectively. The reason why the saturated density cannot reach to the colorization density before initialization is that the heat and pressure of the thermal head (thermal rolling) to the temperature indicating material 4 causes the temperature indicating material 4 thicker than the same before initialization. Thus, the thermal rolling influents to around 20% drop with respect to the colorized density after initialization in consideration of determination environment, some errors, or the like, so that the saturated density is almost 80%. Accordingly, it can be determined that the temperature characteristic controller D does not prevent the mutual action the leuco dye A and the developer B. Since the return ratios of the above mentioned temperature characteristic controllers D of the examples 1 to 18 identify 78% to 105%, the temperature characteristic controllers D of the examples 1 to 18 do not prevent the mutual action between the leuco dye A and the developer B. On the contrary, the return ratio of the comparative example 4 using 1-docosanol is only 62% since the phase separation cannot be completed at environment of 30° C. The return ratio of the comparative example 5 using cyclododecanol is also only 67% although the phase separation has been completed. This is because cyclododecanol prevent the mutual action between the leuco dye A and the developer B.

As mentioned above, it is apparent that the temperature characteristic controller D of the present invention controls the transformation between crystal and amorphous of the composition system by its transformation between crystal and amorphous, and its transformation bet phase separation and non-phase-separation, regardless the melting point thereof. It is also apparent that the temperature characteristic controller D of the present invention obtains the return ratio of the colorization density after the phase separation to be almost same or more to the composition system not including the temperature characteristic controller D. Thus, the temperature characteristic controller D does not prevent the mutual action between the leuco dye A n the developer B after phase separation.

It is introduced the method for evaluation of the mutual action between the electron donating compound A (leuco dye A) and the electron accepting compound B (developer B) by the return ratio shown in Table 1. The similar evaluation can be executed by light transmission ratio or light absorption ratio or the like as other method for evaluation of the mutual action between the electron donating compound A (leuco dye A) and the electron accepting compound B (developer B). For example, following method can be executed; inserting the temperature indicating material 4 into two transparent PET materials; determining change of the light transmission ratio or the light absorption ratio; and evaluating the mutual action between the electron donating compound A (leuco dye A) and the electron accepting compound B (developer B) according to the change of the light transmission ratio or the light absorption ratio.

Consequently, the temperature indicating material 4 of the present invention includes the electron donating compound A (leuco dye A), the electron accepting compound B (developer B), the reversible material C causing reversible transformation between crystal and amorphous, or reversible transformation between phase separation and non-phase-separation, with respect to a part or all of the composition system, and the temperature characteristic controller D, wherein the temperature characteristic controller D is solid-state in room texture, wherein at least the part of the temperature characteristic controller D dissolves in the electron accepting compound B (developer B), the reversible material C, or the electron accepting compound B (developer B) and the reversible material C so as to change speed of the reversible transformation between crystal and amorphous, or speed of the reversible transformation between phase separation and non-phase-separation, with respect to the composition system, by its reversible transformation between crystal and amorphous, or speed of the reversible transformation between phase separation and non-phase separation. The temperature indicating material 4 of the present invention has high sensitivity in the certain temperature range and can improve the reflectance in the decolorized status, so that S/N ratio can be improved. As mentioned above, at least the part of the temperature characteristic controller D dissolves in the electron donating compound A (leuco dye A), the electron accepting compound (developer B), or the reversible material C. The temperature characteristic controller D is the material, which is stable in the crystal status at the temperature monitoring range. The temperature characteristic controller D causes the mutual action strong between the electron accepting compound (developer B) and the reversible material C based on the transformation crystal and amorphous or between phase separation and non-phase-separation by heating and quenching, thereby causing decolorization. The temperature characteristic controller D becomes alone crystal status by the crystallization or the phase separation over temperature monitoring range, thereby meeting the electron donating compound A (leuco dye A) and the electron accepting compound (developer B).

This embodiment introduces the temperature indicator 1 having label form based on the PET base, but this embodiment is only one embodiment and does not limit the scope of the present invention. As application to the temperature indicator 1, thermal transfer ribbon like form, certain printing pattern on the several kinds of base, or the like can be executed.

Obviously, numerous modifications and variations of the present invention are possible in light of the above teachings. It is therefore to be understood that within the scope of the appended claims, the invention may be practiced otherwise than as specifically described herein.

What is claimed is:

1. A temperature indicating material, comprising:

an electron donating compound;

an electron accepting compound;

a reversible material causing reversible transformation between crystal and amorphous states, or reversible transformation between phase separation and non-phase-separation, with respect to a part or all of the composition system; and a temperature characteristic controller;

wherein the temperature characteristic controller is solid-state in room temperature, and is selected from the group consisting of aromatic alcohol having at least one phenol hydroxide group, piperonyl alcohol, benzyl DL-mandelate, benzoin isopropyl ether, benzyl phenyl ketone, methyl 2-benzoylbenzoate, benzyl 2-naphthyl ether, 1-benzyloxy-2-methoxy-4-(1 -propenyl) benzene, 4-benzyl biphenyl and terphenyl, wherein at least a part of the temperature characteristic controller dissolves in the electron accepting compound, the reversible material, or the electron accepting compound and the reversible material so as to change speed of the reversible transformation between crystal and amorphous states, or speed of the reversible transformation between phase separation and non-phase-separation, with respect to the composition system, by its reversible transformation between crystal and amorphous states, or the speed of the reversible transformation between phase separation and non-phase separation, wherein ratio between one mutual action and another mutual action, one mutual action is the mutual action between the electron donating compound and the electron accepting compound after phase separation with respect to the composition system in accordance with change of temperature and time after initialized by heating and quenching, another mutual action is the mutual action between the electron donating compound and the electron accepting compound before initialized, is same or more to the same kind of ratio with respect to the temperature indicating material not including the temperature characteristic controller.

2. A temperature indicating material according to claim 1, wherein the temperature characteristic controller is aromatic alcohol including at least one phenol hydroxide group.

3. A temperature indicating material according to claim 2, wherein the temperature characteristic controller is p-hydroxy phenethyl alcohol.

4. A temperature indicating material according to claim 2, wherein the temperature characteristic controller is 2-hydroxy benzyl alcohol.

5. A temperature indicating material according to claim 2, wherein the temperature characteristic controller is vanillyl alcohol.

6. A temperature indicating material according to claim 1, wherein the temperature characteristic controller is piperonyl alcohol.

7. A temperature indicating material according to claim 1, wherein the temperature characteristic controller is benzyl DL-mandelate.

8. A temperature indicating material according to claim 1, wherein the temperature characteristic controller is benzoin isopropyl ether.

9. A temperature indicating material according to claim 1, wherein the temperature characteristic controller is benzyl phenyl ketone.

10. A temperature indicating material according to claim 1, wherein the temperature characteristic controller is methyl 2-benzoylbenzoate.

11. A temperature indicating material according to claim 1, wherein the temperature characteristic controller is benzyl 2-naphthyl ether.

12. A temperature indicating material according to claim 1, wherein the temperature characteristic controller is 1-benzyloxy-2-methoxy-4-(1-propenyl)benzene.

13. A temperature indicating material according to claim 1, wherein the temperature characteristic controller is 4-benzyl biphenyl.

14. A temperature indicating material according to claim 1, wherein the temperature characteristic controller is terphenyl.

* * * * *

US006830707C1

(12) EX PARTE REEXAMINATION CERTIFICATE (6450th)

United States Patent

(10) Number: US 6,830,707 C1

(45) Certificate Issued: Sep. 23, 2008

Tamura et al.

(54) TEMPERATURE INDICATING MATERIAL

(75) Inventors: Toshiyuki Tamura, Mishima (JP); Takayuki Hiyoshi, Suntoh-gun (JP); Yuichiro Hatanaka, Tagata-gun (JP)

(73) Assignee: Toshiba Tec Kabushiki Kaisha, Tokyo (JP)

Reexamination Request:
No. 90/008,217, Sep. 14, 2006

Reexamination Certificate for:
Patent No.: 6,830,707
Issued: Dec. 14, 2004
Appl. No.: 09/874,058
Filed: Jun. 6, 2001

(30) Foreign Application Priority Data

Jun. 6, 2000 (JP) ........................................ 200-168374

(51) Int. Cl.
*B41M 5/337* (2006.01)
*B41M 5/30* (2006.01)

(52) U.S. Cl. .................................. 252/408.1; 106/31.16

(58) Field of Classification Search ........................ None
See application file for complete search history.

(56) References Cited

U.S. PATENT DOCUMENTS

| | | | |
|---|---|---|---|
| 4,672,401 | A | 6/1987 | Yamada et al. |
| 5,849,651 | A | 12/1998 | Takayama et al. |
| 5,922,115 | A | 7/1999 | Sano et al. |

FOREIGN PATENT DOCUMENTS

| | | |
|---|---|---|
| JP | 60-082382 | 5/1985 |
| JP | 08-258423 | 10/1996 |
| JP | 09-071052 | 3/1997 |
| JP | 9-263052 | 10/1997 |
| JP | 10-088046 | 4/1998 |
| JP | 2000-73050 | 3/2000 |

*Primary Examiner*—Dwayne C. Jones

(57) ABSTRACT

A temperature indicating material of the present invention includes at least an electron donating compound, an electron accepting compound, a reversible material causing reversible transformation between crystal and amorphous states, or reversible transformation between phase separation and non-phase-separation, with respect to a part or all of the composition system; and a temperature characteristic controller having a solid-state in room temperature and at least a part of the temperature characteristic controller dissolves in the electron accepting compound, the reversible material, or the electron accepting compound and the reversible material so as to change the speed of the reversible transformation between crystal and amorphous, or speed of the reversible transformation between phase separation and non-phase-separation, with respect to the composition system, by its reversible transformation between crystal and amorphous states, or the speed of the reversible transformation between phase separation and non-phase separation.

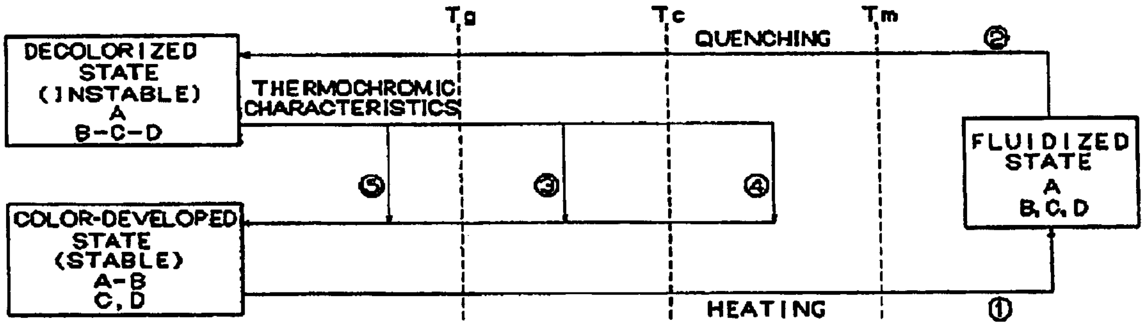

Tg:GLASS TRANSITION POINT
Tc:CRYSTALLIZATION POINT
Tm:MELTING POINT

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 9, 11, 13 and 14 are cancelled.

Claims 2–4, 6–8, 10 and 12 were not reexamined.

* * * * *